(12) United States Patent
Tiffany et al.

(10) Patent No.: US 8,580,043 B2
(45) Date of Patent: Nov. 12, 2013

(54) AUTOMATED CLEANING METHOD FOR AN AIRCRAFT FUSELAGE INTERIOR

(71) Applicants: Todd S. Tiffany, North Bend, WA (US); Robert Neth, Kingston, WA (US)

(72) Inventors: Todd S. Tiffany, North Bend, WA (US); Robert Neth, Kingston, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/745,736

(22) Filed: Jan. 18, 2013

(65) Prior Publication Data

US 2013/0125926 A1 May 23, 2013

Related U.S. Application Data

(62) Division of application No. 12/970,264, filed on Dec. 16, 2010, now Pat. No. 8,381,747.

(51) Int. Cl.
*B08B 7/04* (2006.01)

(52) U.S. Cl.
USPC ...... 134/18; 134/22.1; 134/22.11; 134/22.12; 134/22.18; 134/34; 15/1

(58) Field of Classification Search
None
See application file for complete search history.

(56) References Cited

U.S. PATENT DOCUMENTS

| | | | |
|---|---|---|---|
| 3,460,177 A | 8/1969 | Rhinehart et al. |
| 3,477,178 A | 11/1969 | Hulbert |
| 3,830,430 A | 8/1974 | Hartunian |
| 3,858,043 A | 12/1974 | Sick et al. |
| 3,961,983 A | 6/1976 | Crandall et al. |
| 4,073,302 A | 2/1978 | Jones |
| 4,163,455 A | 8/1979 | Hebert et al. |
| 4,167,950 A | 9/1979 | Schaefer et al. |
| 4,240,175 A | 12/1980 | Rogers |
| 4,341,232 A | 7/1982 | Maton |
| 4,677,997 A | 7/1987 | Strauss |
| 4,690,159 A | 9/1987 | Vadakin et al. |
| 4,945,862 A | 8/1990 | Vadakin |
| 5,004,156 A | 4/1991 | Montanier |
| 5,317,782 A | 6/1994 | Matsuura et al. |
| 5,561,883 A | 10/1996 | Landry et al. |
| 5,718,382 A | 2/1998 | Jaeger |
| 5,964,645 A | 10/1999 | Jemt |
| 6,206,016 B1 | 3/2001 | MacNeil et al. |
| 7,040,331 B2 | 5/2006 | Garman et al. |
| 7,306,000 B1 | 12/2007 | Nezat, II |
| 2003/0043964 A1 | 3/2003 | Sorenson |
| 2009/0211605 A1 | 8/2009 | Ahmad |
| 2009/0287789 A1 | 11/2009 | Dolan et al. |

FOREIGN PATENT DOCUMENTS

WO 2007130545 A2 11/2007

OTHER PUBLICATIONS

EPO European Search Report for Counterpart EP Application No. 11193565.6, Apr. 23, 2012, 6 pages.
USPTO Non-Final Office Action for Parent U.S. Appl. No. 12/970,264, Mar. 21, 2012, 29 pages.
USPTO Final Office Action for Parent U.S. Appl. No. 12/970,264, Jul. 17, 2012, 28 pages.

*Primary Examiner* — Eric Golightly

(57) ABSTRACT

An automated cleaning system for an aircraft fuselage interior is provided. The system has a movable assembly designed to fit within an aircraft fuselage interior to be cleaned. The movable assembly has a removable track assembly and an automated transport mechanism mounted on the removable track assembly, the automated transport mechanism being a guided cart that travels on the removable track assembly. The movable assembly further has a manifold and frame assembly mounted on the automated transport mechanism and a fluid dispensing assembly coupled to the manifold and frame assembly for dispensing fluids onto an aircraft fuselage interior surface. The system further has a fluid management system coupled to the movable assembly for supplying the fluids to the fluid dispensing assembly. The system further has a control system that communicates with and controls the movable assembly and the fluid management system.

13 Claims, 17 Drawing Sheets

AUTOMATED CLEANING METHOD FOR AN AIRCRAFT FUSELAGE INTERIOR

CROSS-REFERENCE TO RELATED APPLICATIONS

The present application is a divisional of and claims priority to pending application Ser. No. 12/970,264, filed Dec. 16, 2010, issued as U.S. Pat. No. 8,381,747 on Feb. 26, 2013, and entitled AUTOMATED CLEANING SYSTEM FOR AN AIRCRAFT FUSELAGE INTERIOR, the entire contents of which is incorporated herein by reference.

BACKGROUND

1) Field of the Disclosure

The disclosure relates generally to systems and methods for cleaning aircraft, and more particularly, to automated systems and methods for cleaning aircraft fuselage interiors.

2) Description of Related Art

During the process of constructing an aircraft, such as a commercial aircraft, a primer material is typically applied to the surface of the fuselage interior for the purpose of corrosion protection. In order to minimize or eliminate contaminants that may exist on the surface of the fuselage interior prior to applying the primer and/or in order to activate the primer, the surface of the fuselage interior can be cleaned by typically washing the surface of the fuselage interior with water and a cleaning solution and then drying the surface of the fuselage interior with an air hose. The fuselage interior surface to be cleaned can typically be in the range of 2000 square feet to 4000 square feet. Such cleaning process may be required every three to four days for a year or more while the aircraft is being constructed.

Known systems and methods for cleaning fuselage interiors typically include manual systems and methods. One known manual cleaning method for cleaning an upper half or upper portion of the aircraft fuselage interior involves a four-step method that employs the use of a movable gantry with a platform. The known manual method includes a first step of a first operator 48 manually spraying water 52 from a water hose 50 to initially wet down an aircraft fuselage interior surface 38 of the upper half or upper portion 31 of the aircraft fuselage interior 30 (see FIG. 4). The known manual method further includes a second step of an operator manually spraying a cleaning solution or cleaning fluid, such as a detergent or soap, from a cleaning solution or cleaning fluid hose to apply to the wet surface of the aircraft fuselage interior. The known manual method further includes a third step of an operator spraying water from a water hose to rinse off the cleaning solution or cleaning fluid. The known manual method further includes a fourth step of a second operator 62 manually spraying compressed air 66 from an air hose 64 to blow dry the aircraft fuselage interior surface 38 of the upper half or upper portion 31 of the aircraft fuselage interior 30 that has been wetted, washed and rinsed (see FIG. 5).

However, such known manual method can be labor intensive and can require up to four human operators or more. Moreover, such known manual method can be time intensive and can require twenty-four hours or more to complete for a single cleaning operation that includes wetting, washing, rinsing and drying of the fuselage interior. In addition, such known manual method can result in operators having to walk on wet surfaces, such as fuselage open flooring surfaces, that become wet from the spraying of water or cleaning solution. Moreover, such known manual method may not provide complete cleaning coverage of the upper half or upper portion of the aircraft fuselage interior surface by the water, the cleaning solution and the compressed air should an operator miss an area to be covered or should an operator become fatigued during application of the water, the cleaning solution, or the compressed air. In addition, such known manual method may create ergonomic issues for operators if the operators use repetitive arm movements during application and spraying of the water, cleaning solution, or the compressed air. Finally, such known manual method can require the use of separate hoses for dispensing the water, the cleaning solution, and the compressed air, and such known manual method may not provide mounting fixtures to mount the hoses on the floor or in an elevated manner to avoid the creation of any obstacles to the operators during the cleaning process.

Accordingly, there is a need in the art for an automated system and method for cleaning aircraft fuselage interiors that provide advantages over known systems and methods.

SUMMARY

This need for an automated system and method for cleaning aircraft fuselage interiors is satisfied. As discussed in the below detailed description, embodiments of the system and method may provide significant advantages over existing systems and methods.

In an embodiment of the disclosure, there is provided an automated cleaning system for an aircraft fuselage interior. The system comprises a movable assembly designed to fit within an aircraft fuselage interior to be cleaned. The movable assembly comprises a removable track assembly, an automated transport mechanism mounted on the removable track assembly, a manifold and frame assembly mounted on the automated transport mechanism, and a fluid dispensing assembly coupled to the manifold and frame assembly for dispensing one or more fluids onto an aircraft fuselage interior surface to be cleaned. The system further comprises a fluid management system coupled to the movable assembly for supplying the one or more fluids to the fluid dispensing assembly. The system further comprises a control system that communicates with and controls the movable assembly and the fluid management system.

In another embodiment of the disclosure, there is provided an automated cleaning system for an aircraft fuselage interior that can be managed and operated by a single operator. The system comprises a movable assembly designed to fit within an aircraft fuselage interior to be cleaned. The movable assembly comprises a removable track assembly that can be connected to and disconnected from a floor of the aircraft fuselage interior to be cleaned. The movable assembly further comprises an air motor driven automated guided cart mounted on the removable track assembly for traveling along a length of the aircraft fuselage interior to be cleaned. The movable assembly further comprises a snap together manifold and frame assembly mounted on the automated guided cart and having one or more pneumatic linear drive devices for adjusting the manifold and frame assembly to adjust to any change of an inner diameter of the aircraft fuselage interior to be cleaned. The movable assembly further comprises a fluid dispensing assembly coupled to the manifold and frame assembly for dispensing one or more fluids onto an upper portion of an aircraft fuselage interior surface to be cleaned. The system further comprises a fluid management system coupled to the movable assembly for supplying the one or more fluids to the fluid dispensing assembly. The system further comprises a motion controller system for adjusting a height of the manifold and frame assembly to adjust to any change of an inner diameter of the aircraft fuselage interior to be cleaned. The system further comprises a control system that communicates with and controls the movable assembly, the fluid management system, and the motion controller system. The system further comprises a light curtain for safety shut off of the movable assembly.

In another embodiment of the disclosure, there is provided a method for cleaning an aircraft fuselage interior. The method comprises providing an automated cleaning system. The automated cleaning system comprises a movable assembly designed to fit within an aircraft fuselage interior to be cleaned. The movable assembly further comprises a removable track assembly. The movable assembly comprises an automated transport mechanism mounted on the removable track assembly. The movable assembly further comprises a manifold and frame assembly mounted on the automated transport mechanism. The movable assembly further comprises a fluid dispensing assembly coupled to the manifold and frame assembly for dispensing one or more fluids onto an upper portion of an aircraft fuselage interior surface to be cleaned. The system further comprises a fluid management system coupled to the movable assembly for supplying the one or more fluids to the fluid dispensing assembly. The system further comprises a control system that communicates with and controls the movable assembly and the fluid management system. The method further comprises connecting the movable assembly to the aircraft fuselage interior to be cleaned. The method further comprises using the automated cleaning system in a first pass along a length of the aircraft fuselage interior to dispense water onto a substantially entire upper portion of the aircraft fuselage interior surface to be cleaned. The method further comprises using the automated cleaning system in a second pass along the length of the aircraft fuselage interior to dispense a cleaning fluid and a water rinse simultaneously onto the substantially entire upper portion of the aircraft fuselage interior surface to be cleaned. The method further comprises using the automated cleaning system in a third pass along the length of the aircraft fuselage interior to dispense compressed air to blow dry the substantially entire upper portion of the aircraft fuselage interior surface to be cleaned. The method further comprises disconnecting the movable assembly from the aircraft fuselage interior that has been cleaned.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
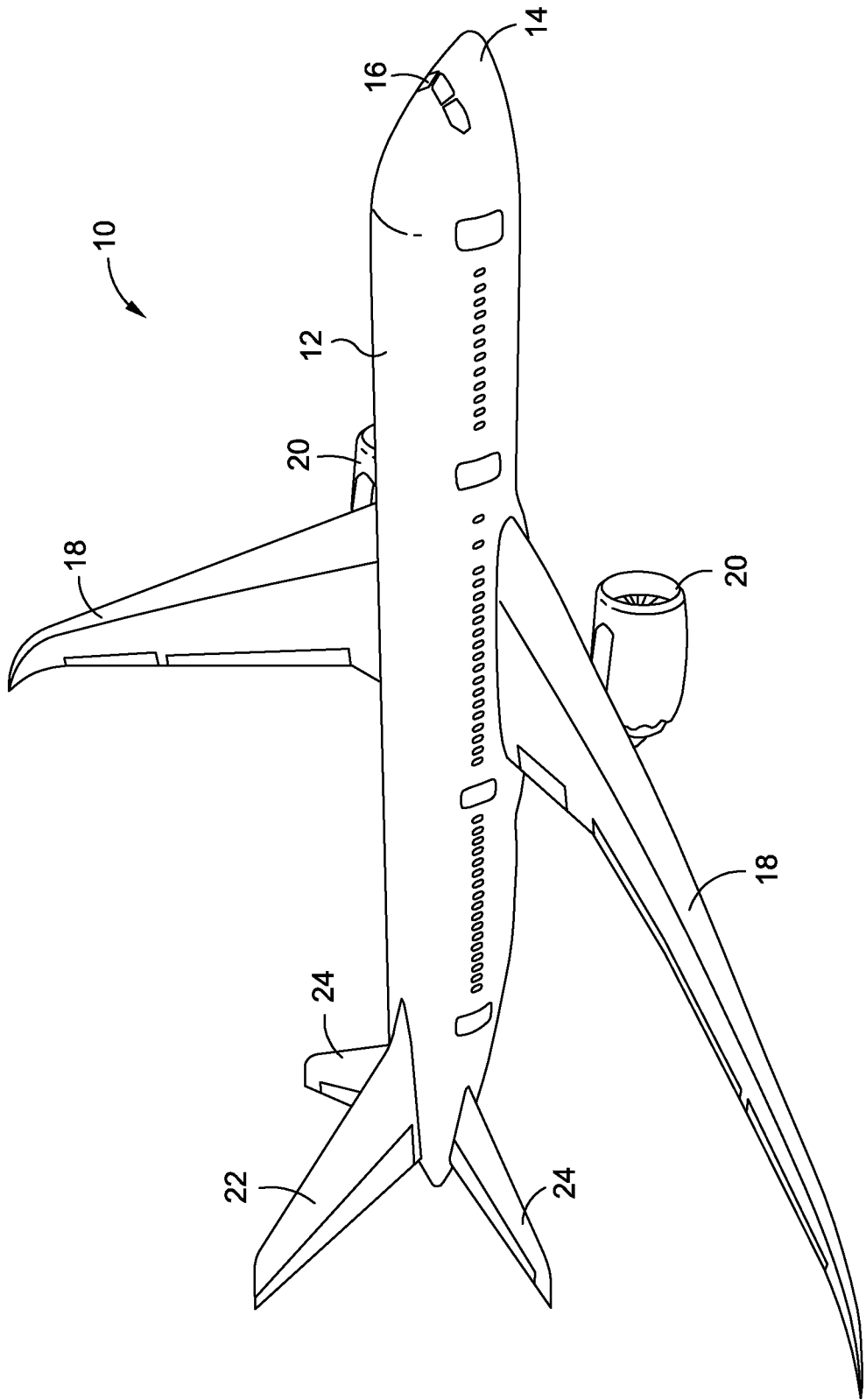
FIG. 1 is an illustration of a perspective view of an exemplary aircraft for which one of the embodiments of an automated cleaning system and method may be used.

Now referring to the Figures, FIG. 1 is an illustration of a perspective view of an exemplary aircraft 10 for which one of the embodiments of an automated cleaning system 70, 71, 73 (see FIGS. 6-8) and a method 300 (see FIG. 17) may be used. The aircraft 10 comprises a fuselage 12, a nose 14, a cockpit 16, wings 18 operatively coupled to the fuselage 12, one or more propulsion units 20, a tail vertical stabilizer 22, and one or more tail horizontal stabilizers 24. Although the aircraft 10 shown in FIG. 1 is generally representative of a commercial passenger aircraft, the automated cleaning systems 70, 71, 73 and method 300 disclosed herein may also be employed in the cleaning of virtually any other type of aircraft. More specifically, the teachings of the disclosed embodiments may be applied to the cleaning of other passenger aircraft, cargo aircraft, military aircraft, and any other types of aircraft. It may also be appreciated that alternate embodiments of systems, methods and apparatuses in accordance with the disclosure may be utilized in other aerial vehicles.

Figure 2:
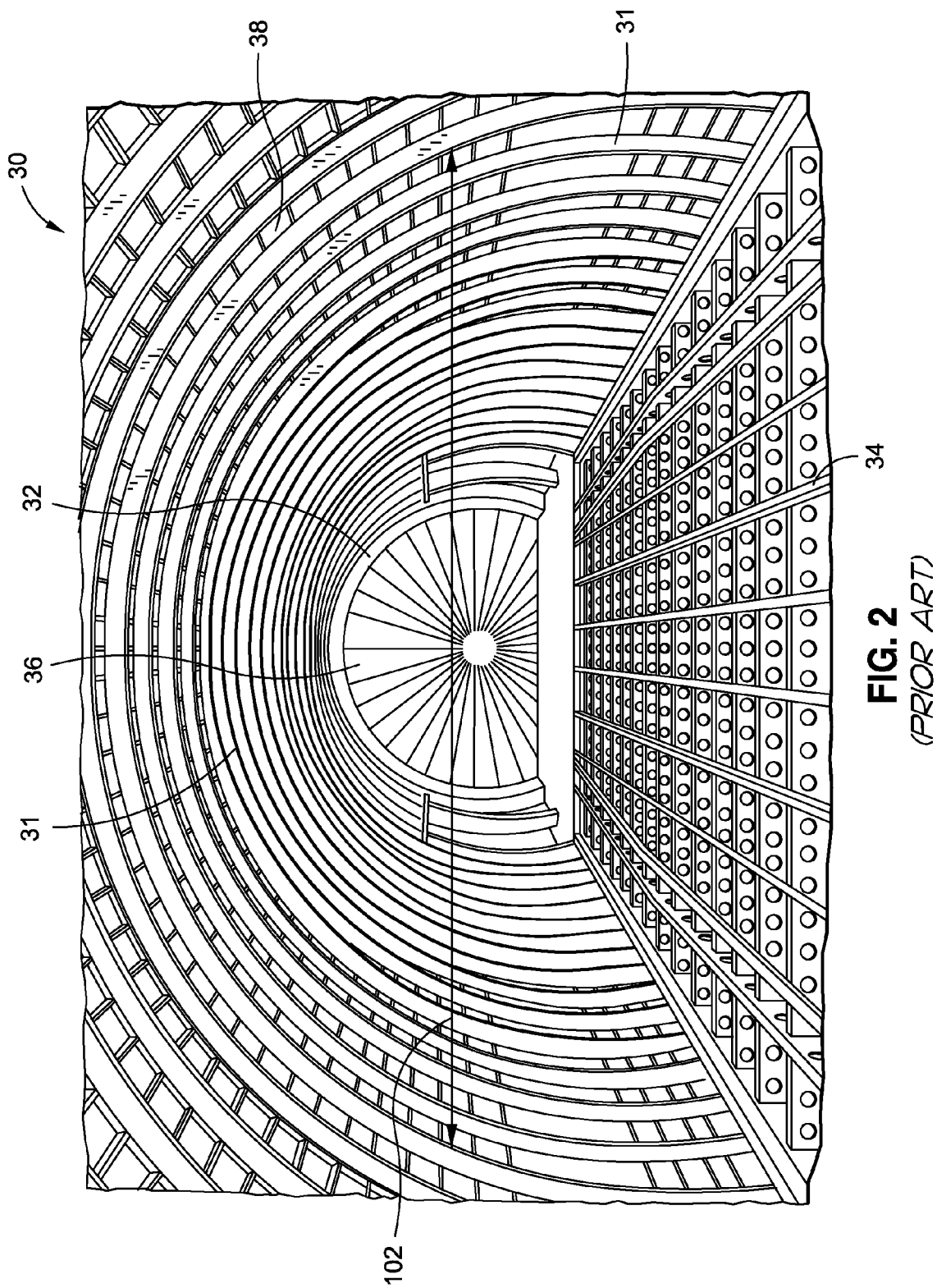
FIG. 2 is an illustration of a front perspective view of an existing aircraft fuselage interior.

FIG. 2 is an illustration of a front perspective view of an existing aircraft fuselage interior 30 that is under construction and that is to be cleaned. The aircraft fuselage interior 30 has an upper half or upper portions 31, a lower half or lower portion 33 (see FIGS. 9-10), a substantially cylindrical body 32, a floor 34 having an open structure, a first end 36 that is closed, and a second end 37 (see FIGS. 9-10) that is open for entry by operators, the automated cleaning systems 70, 71, 73 and other suitable equipment and devices. An aircraft fuselage interior surface 38 that is to be cleaned can typically be in the range of 2000 square feet to 4000 square feet.

Figure 3:
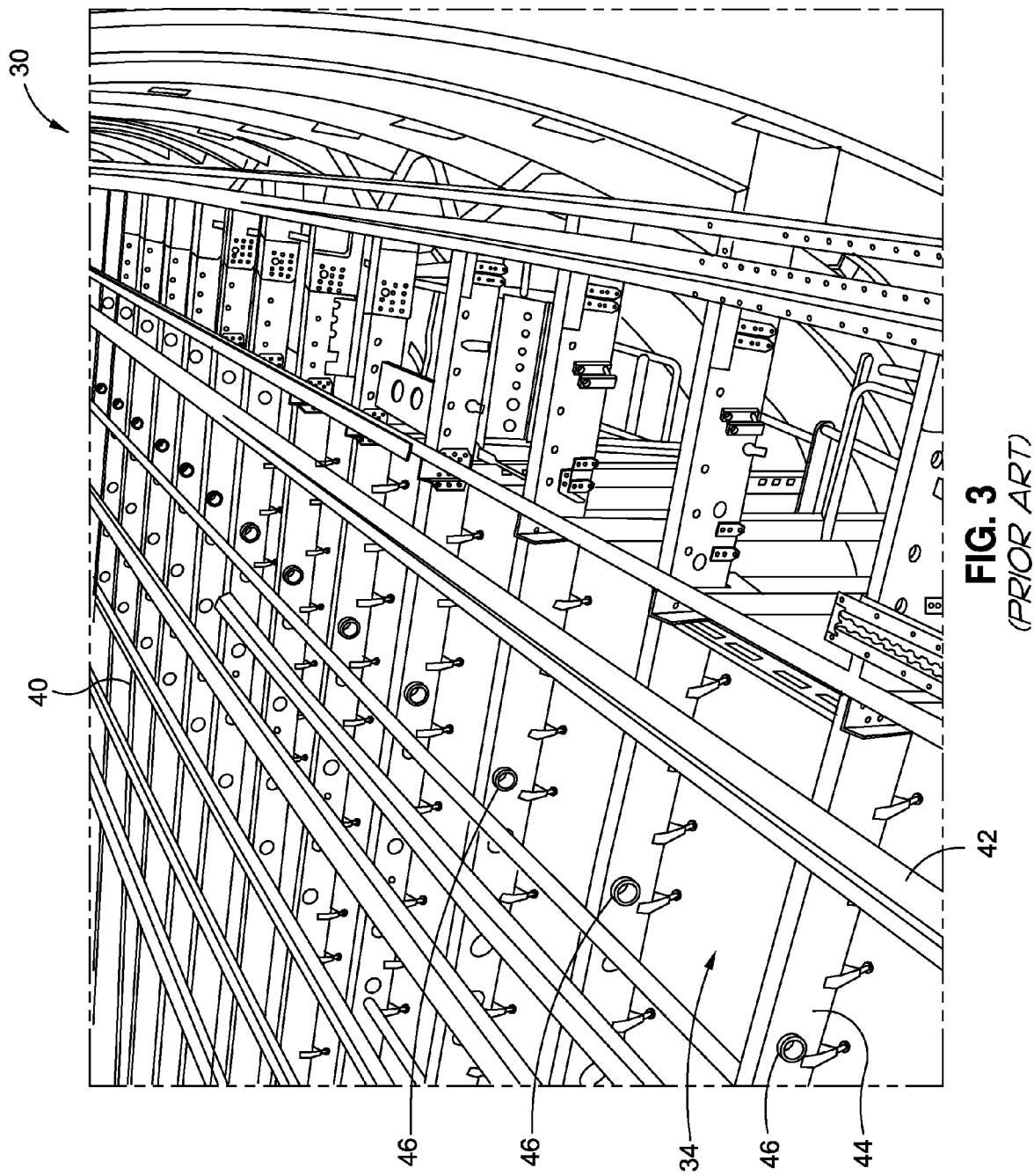
FIG. 3 is an illustration of a top close-up perspective view of the floor of the aircraft fuselage interior of FIG. 2.

FIG. 3 is an illustration of a top close-up perspective view of the floor 34 of the aircraft fuselage interior 30 of FIG. 2. The floor 34 may have an open grid-like structure 40 with a plurality of longitudinal or vertical beams 42 intersecting with a plurality of lateral or horizontal beams 44. The lateral or horizontal beams 44 may each have a plurality of openings 46 formed in the lateral of horizontal beams 44.

Figure 4:
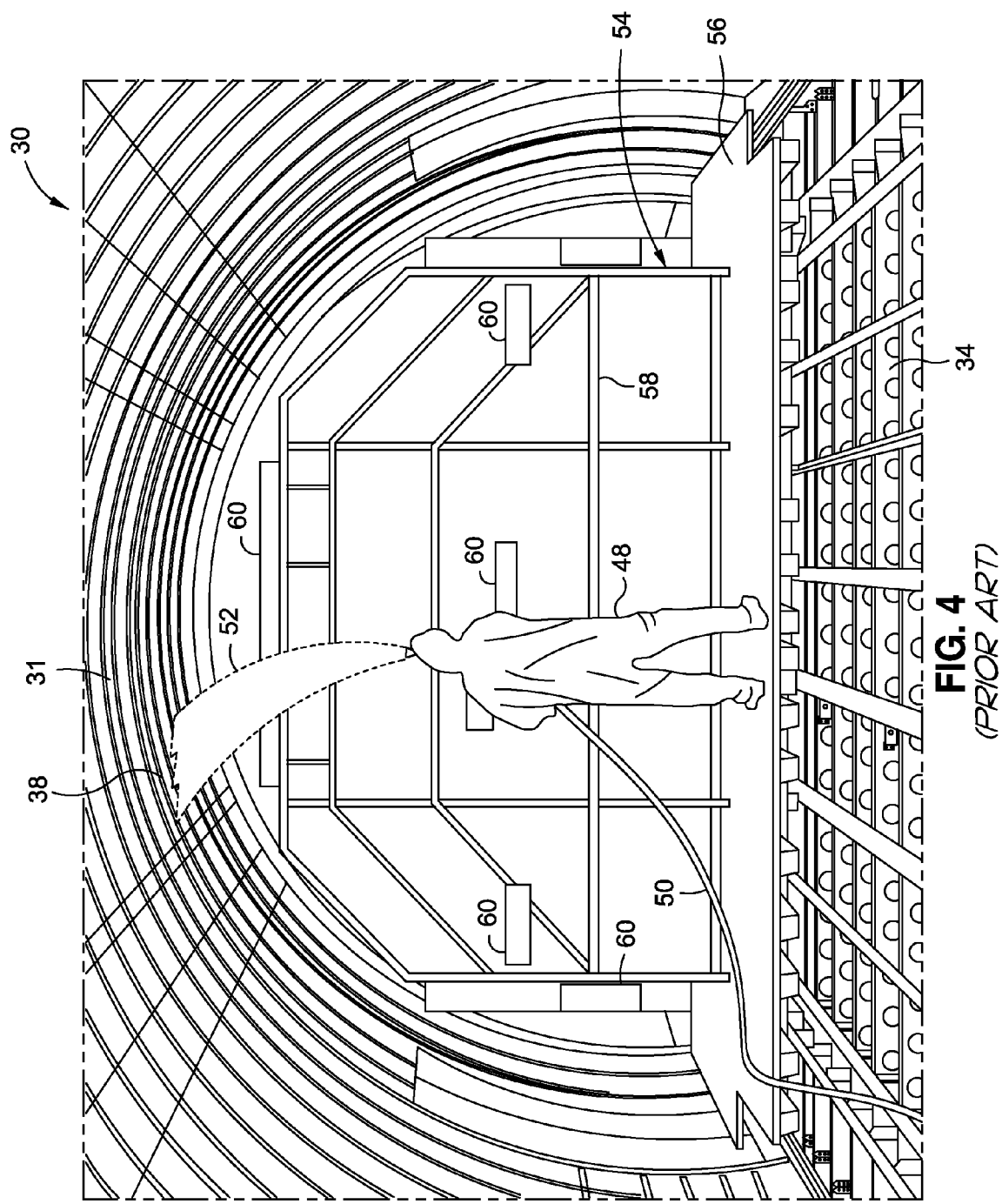
FIG. 4 is an illustration of a front perspective view of an operator using a previous manual method of washing the aircraft fuselage interior.

FIG. 4 is an illustration of a front perspective view of a first operator 48 using a previous manual method of cleaning the aircraft fuselage interior 30. FIG. 4 shows the first operator 48 manually spraying water 52 from a water hose 50 to initially wet down the aircraft fuselage interior surface 38. The first operator 48 is shown using a gantry assembly 54 designed to fit within the aircraft fuselage interior 30. The gantry assembly 54 may have a gantry platform 56 on which the first operator 48 can stand and be supported. The gantry assembly 54 may further have a gantry frame 58 with a plurality of lighting fixtures 60 coupled to the gantry frame 58.

Figure 5:
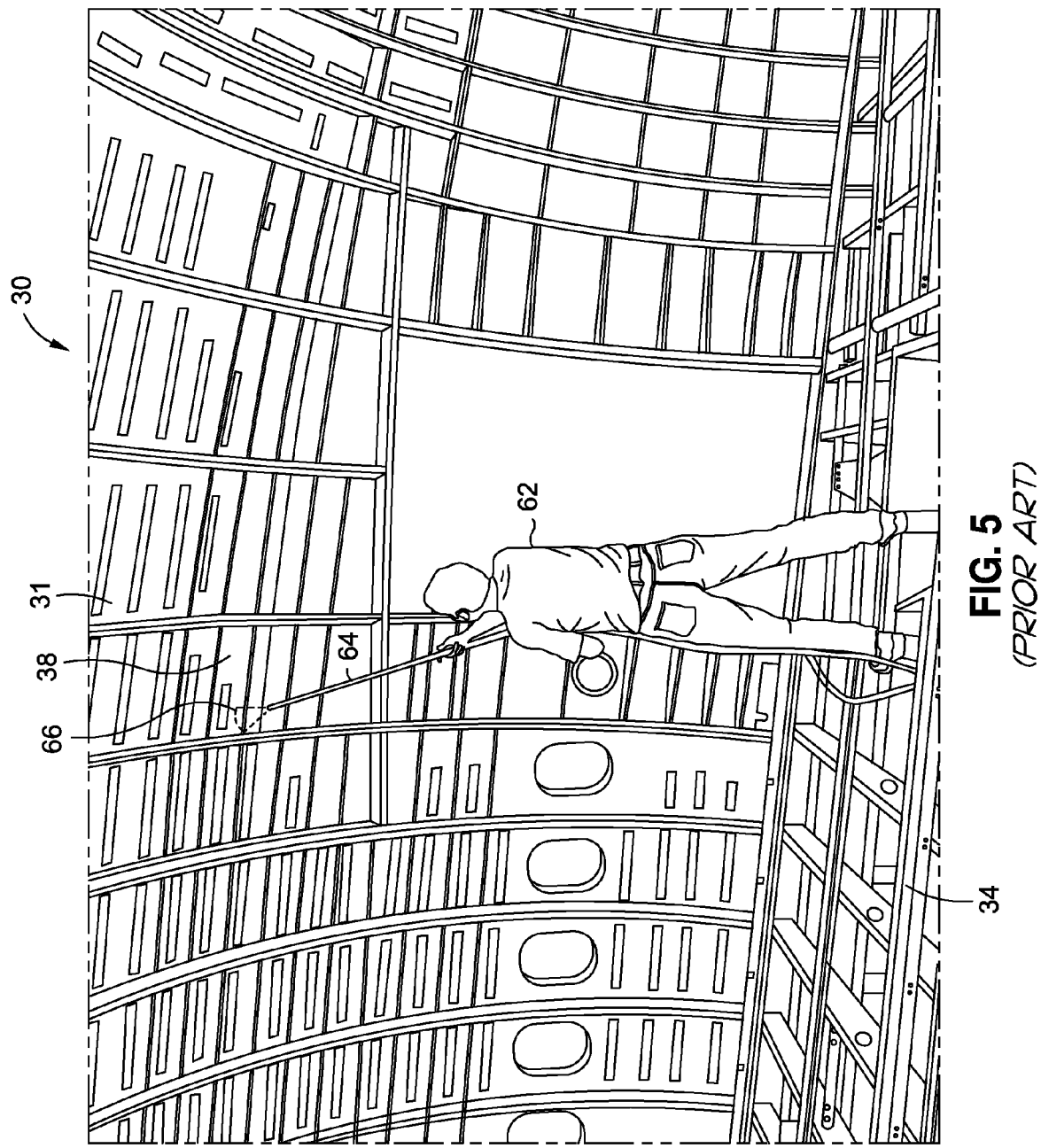
FIG. 5 is an illustration of a side perspective view of another operator using a previous manual method of drying the aircraft fuselage interior.

FIG. 5 is an illustration of a side perspective view of a second operator 62 using a previous manual method of drying the aircraft fuselage interior 30. FIG. 5 shows the second operator 62 manually spraying compressed air 66 from an air hose 64 to blow dry the upper half or upper portion 31 of the aircraft fuselage interior surface 38 that has been previously wetted, washed and rinsed (see FIG. 5). FIG. 5 shows the second operator 62 standing on the floor 34 of the aircraft fuselage interior 30 rather than using the gantry assembly 54 and standing on the gantry platform 56.

Figure 6:
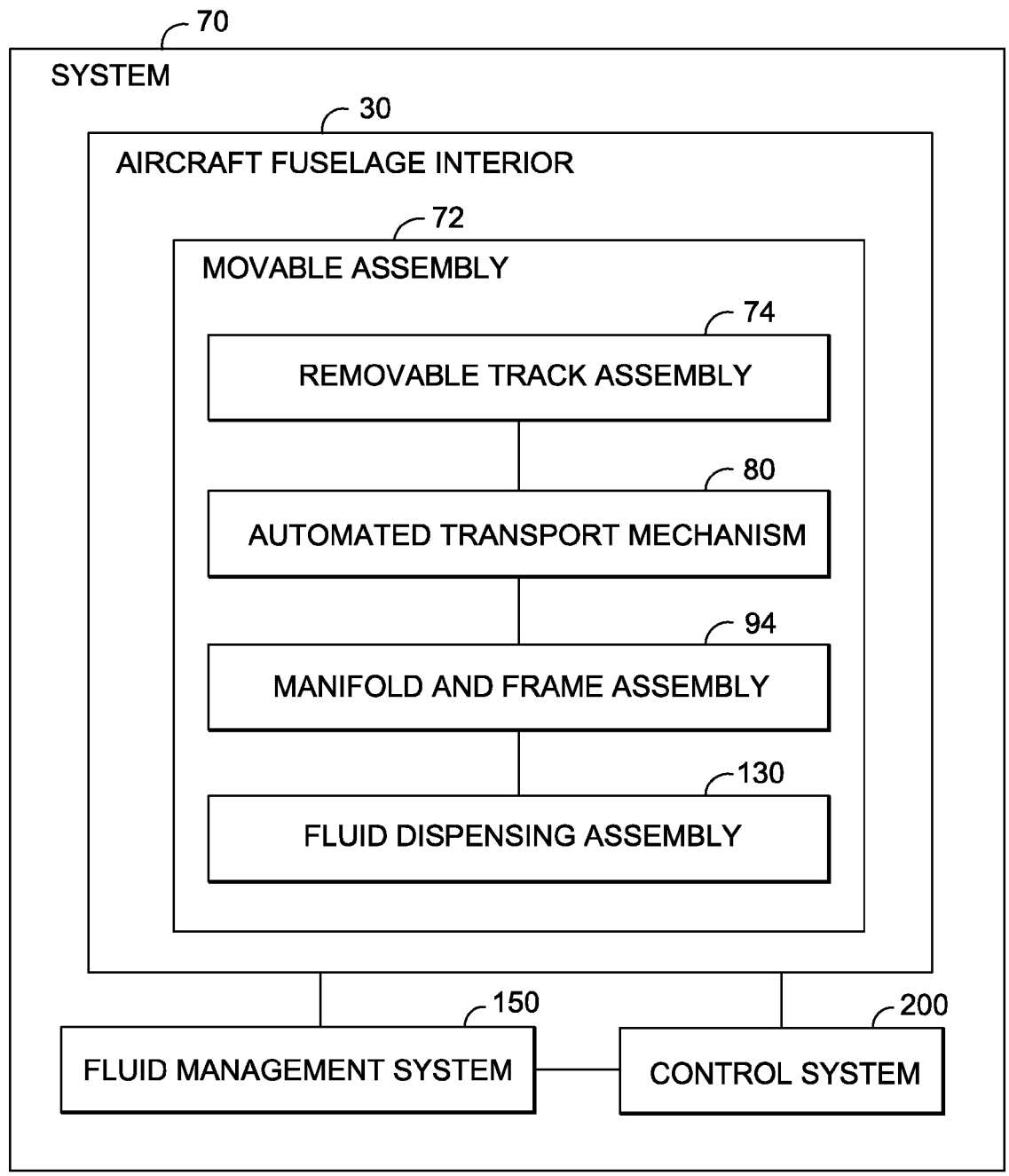
FIG. 6 is an illustration of a block diagram of one of the embodiments of an automated cleaning system of the disclosure.
Figure 7:
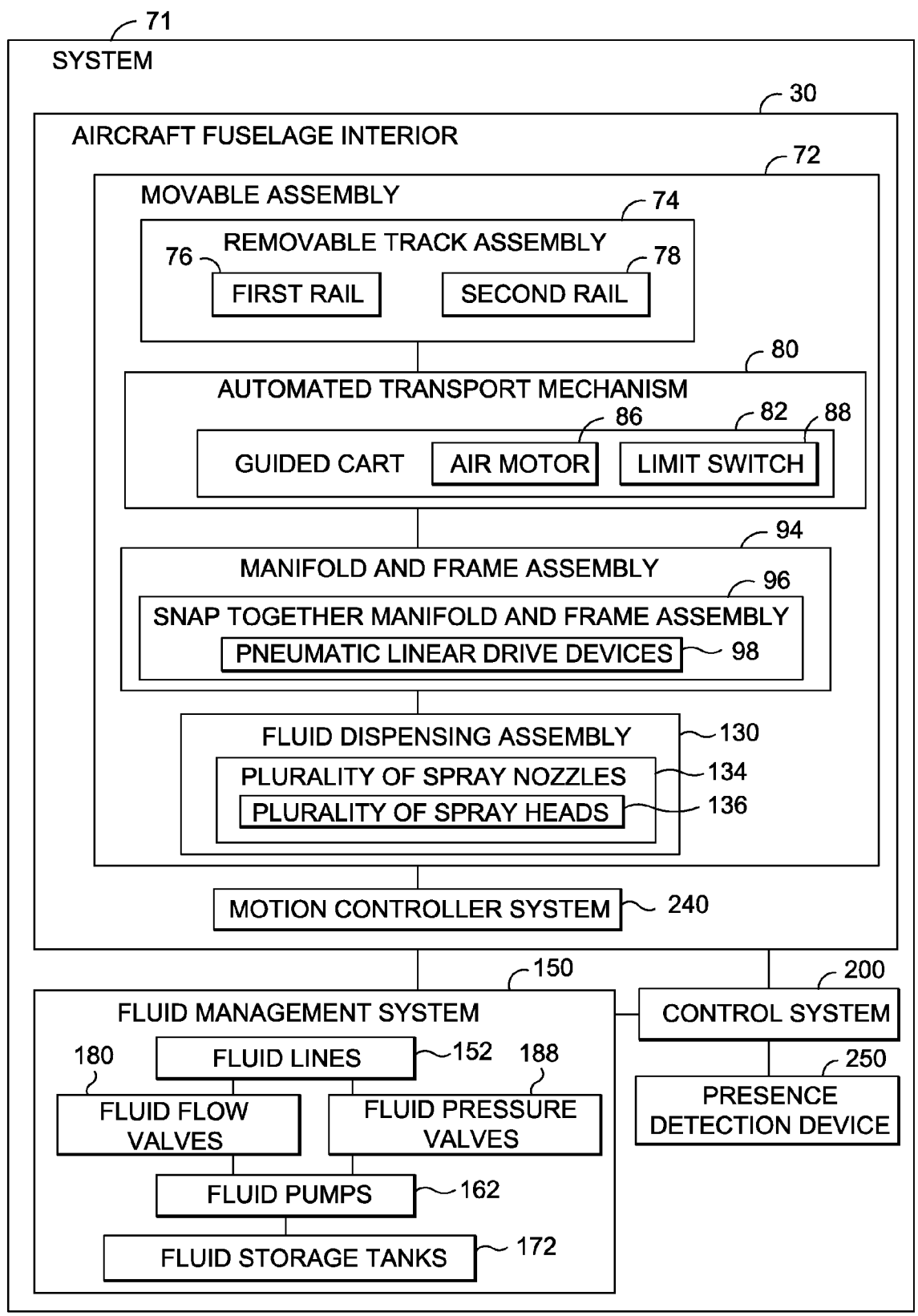
FIG. 7 is an illustration of a block diagram of another one of the embodiments of an automated cleaning system of the disclosure.
Figure 8:
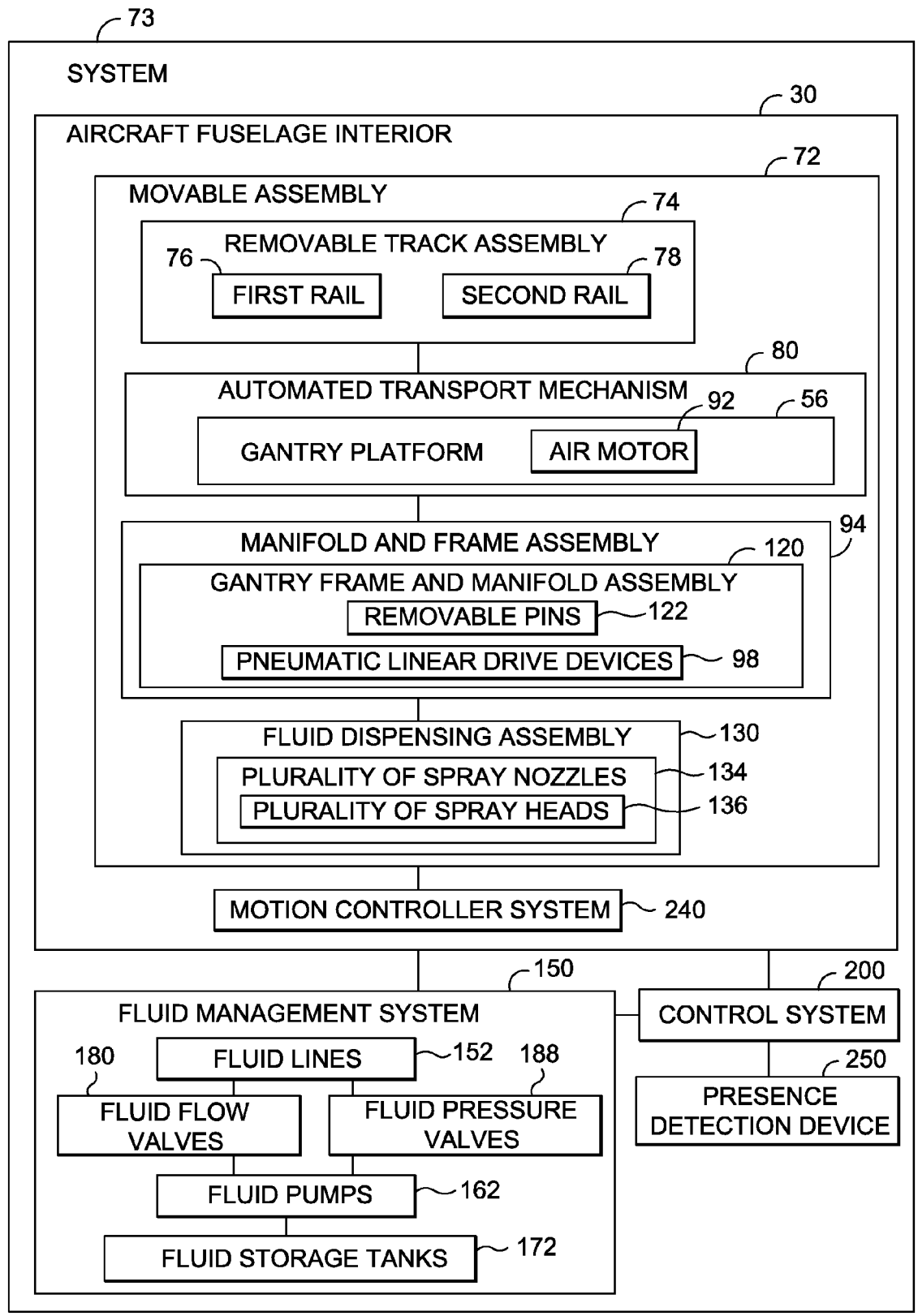
FIG. 8 is an illustration of a block diagram of another one of the embodiments of an automated cleaning system of the disclosure.
Figure 9:
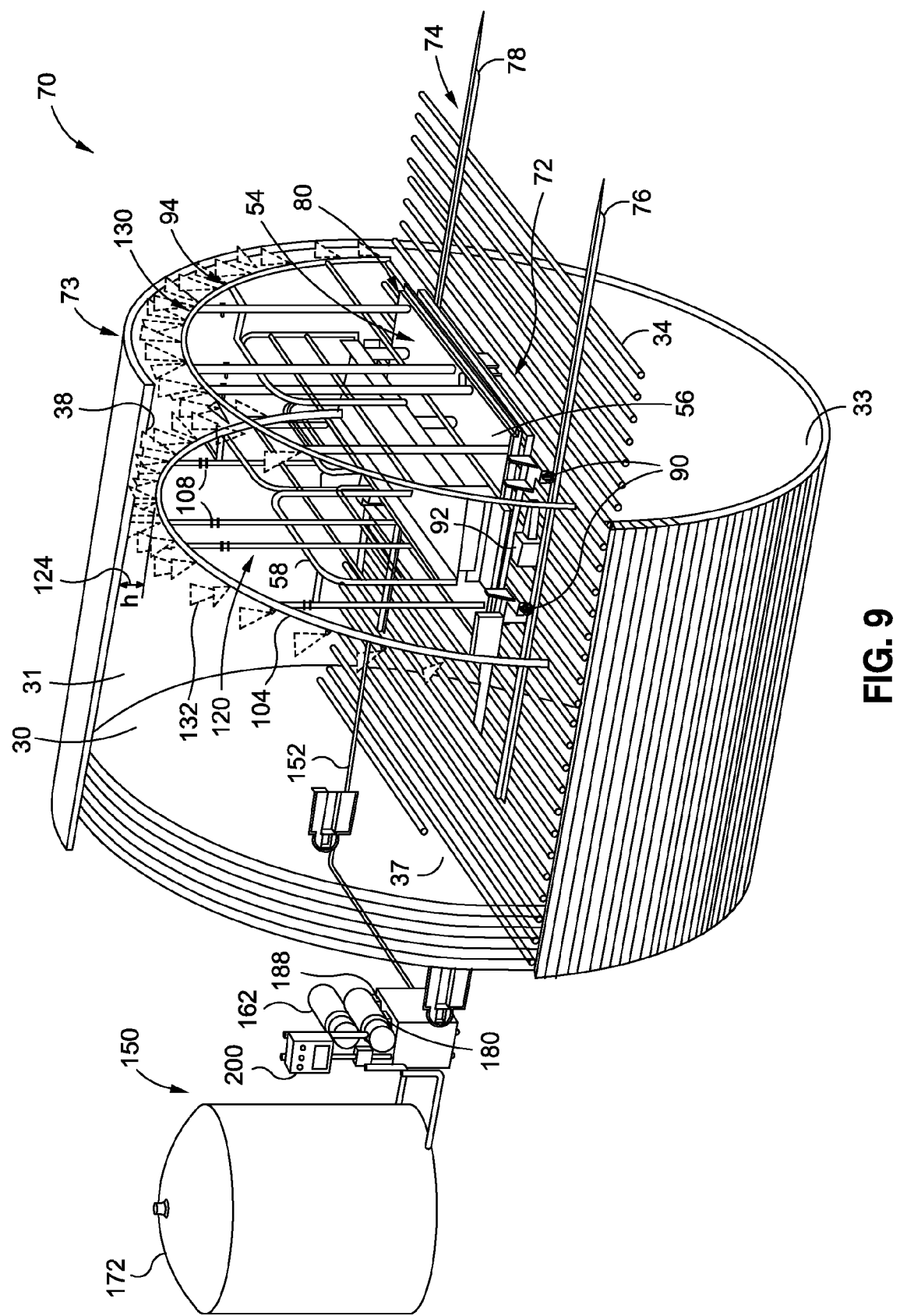
FIG. 9 is an illustration of a perspective view of one of the embodiments of an automated cleaning system of the disclosure.
Figure 10:
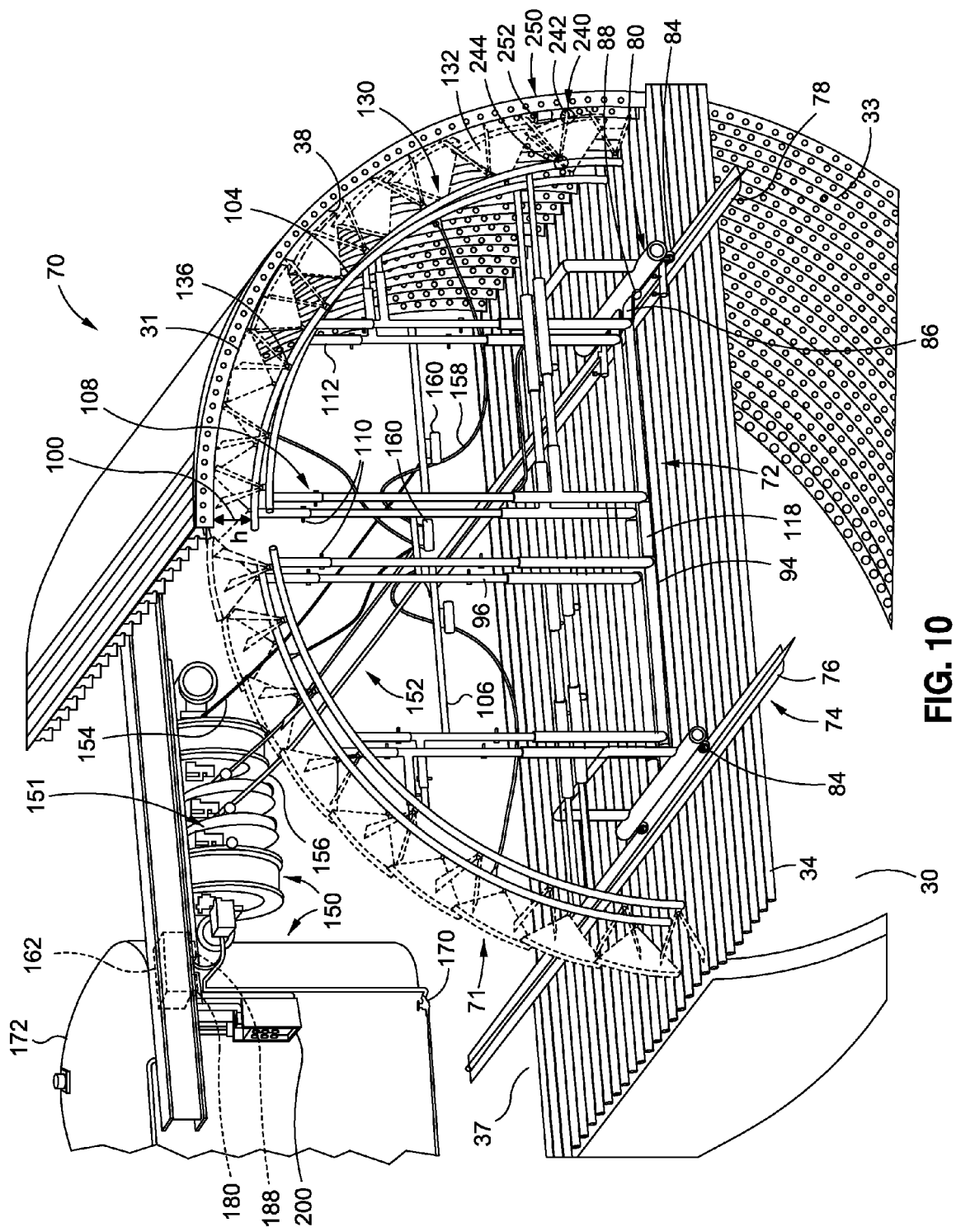
FIG. 10 is an illustration of a perspective view of another one of the embodiments of an automated cleaning system of the disclosure.
Figure 12:
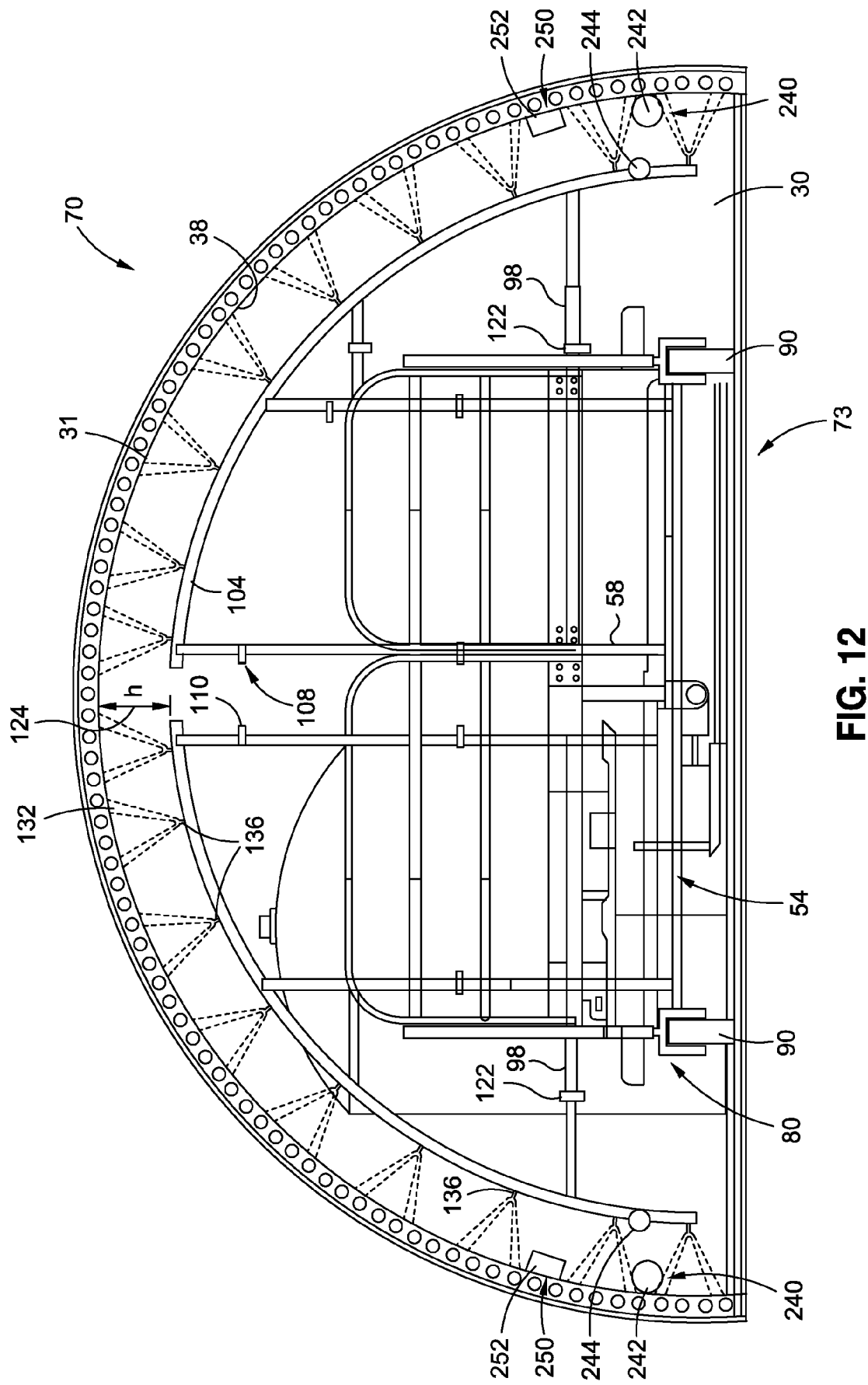
FIG. 12 is an illustration of a front view of the automated cleaning system of FIG. 10.

FIG. 6 is an illustration of a block diagram of one of the embodiments of an automated cleaning system 70 for cleaning an aircraft fuselage interior 30 (see also FIGS. 2, 9 and 10). FIG. 7 is an illustration of a block diagram of another one of the embodiments of an automated cleaning system 71 of the disclosure. FIG. 8 is an illustration of a block diagram of another one of the embodiments of an automated cleaning system 73 of the disclosure. FIG. 9 is an illustration of a perspective view of one of the embodiments of the automated cleaning system 73 of the disclosure. FIG. 10 is an illustration of a perspective view of another one of the embodiments of the automated cleaning system 71 of the disclosure. FIG. 12 is an illustration of a front view of the automated cleaning system 71 of FIG. 10. The aircraft fuselage interior 30 comprises an upper half or upper portion 31 and a lower half or lower portion 33 (see FIGS. 9-10) separated by a floor 34. Preferably, the upper half or upper portion 31 of the aircraft fuselage interior 30 is cleaned with one of the embodiments of the automated cleaning system 70, 71, 73 and automated cleaning method 300.

As shown in FIGS. 6-8, the automated cleaning system 70 comprises a movable assembly 72 designed to fit within the aircraft fuselage interior 30 to be cleaned. The movable assembly 72 comprises a removable track assembly 74. The removable track assembly 74 comprises a first rail 76 and a second rail 78 that are spaced apart in parallel and that can be connected to and disconnected from the floor 34 (see also FIGS. 3, 9 and 10) of the aircraft fuselage interior 30. The first rail 76 and the second rail 78 may be attached or mounted into the openings 46 (see FIG. 3) in the lateral or horizontal beams 46 of the floor 34 of the aircraft fuselage interior 30. The removable track assembly 74 is preferably modular, and each of the first rail 76 and the second rail 78 may comprise one or more pieces attached together lengthwise along a length of the aircraft fuselage interior 30. Preferably, the first rail 76 comprises two longitudinal pieces that connect together lengthwise, and preferably, the second rail 78 comprises two longitudinal pieces that connect together lengthwise.

The movable assembly 72 further comprises an automated transport mechanism 80 mounted on the removable track assembly 74. In one embodiment the automated transport mechanism 80 comprises a guided cart 82 (see FIGS. 7 and 10) that travels on the removable track assembly 74 back and forth along a length of the aircraft fuselage interior 30 to be cleaned. The guided cart 82 preferably has one or more wheels 84 on each side designed to fit within the first rail 76 and the second rail 78, respectively. The wheels 84 enable the guided cart 82 to move forward and backward along the first rail 76 and the second rail 78 of the removable track assembly 74. The guided cart 82 is preferably air motor driven with an air motor 86 that is designed to return the guided cart 82 to a home position. The air motor 86 which is preferably a pneumatic air motor drives the wheels 84 that guide or push the guided cart 82 along the first rail 76 and the second rail 78. The air motor 86 may have a limit switch 88 (see FIGS. 10-11) for moving the guided cart 82 back and fourth on the removable track assembly 74 and reversing the air so that the guided cart 82 moves back to a home or initial position. The limit switch 88 can act as an electric stop device to stop the motion of the guided cart 82.

In another embodiment the automated transport mechanism 80 comprises a gantry platform 56 of a gantry assembly 54 (see FIGS. 8 and 9) that travels on the removable track assembly 74 back and forth along a length of the aircraft fuselage interior 30 to be cleaned. The gantry platform 56 preferably has one or more wheels 90 designed to fit within the first rail 76 and the second rail 78, respectively. The wheels 90 enable the gantry platform 56 to move forward and backward along the first rail 76 and the second rail 78 of the removable track assembly 74. The gantry platform 56 is preferably air motor driven with an air motor 92. The air motor 92 or pneumatic motor drives the wheels 90 that guide or push the gantry platform 56 along the first rail 76 and the second rail 78. The gantry assembly 54 may also have its own set of removable rails that can act as the removable track assembly 74.

Figure 11:
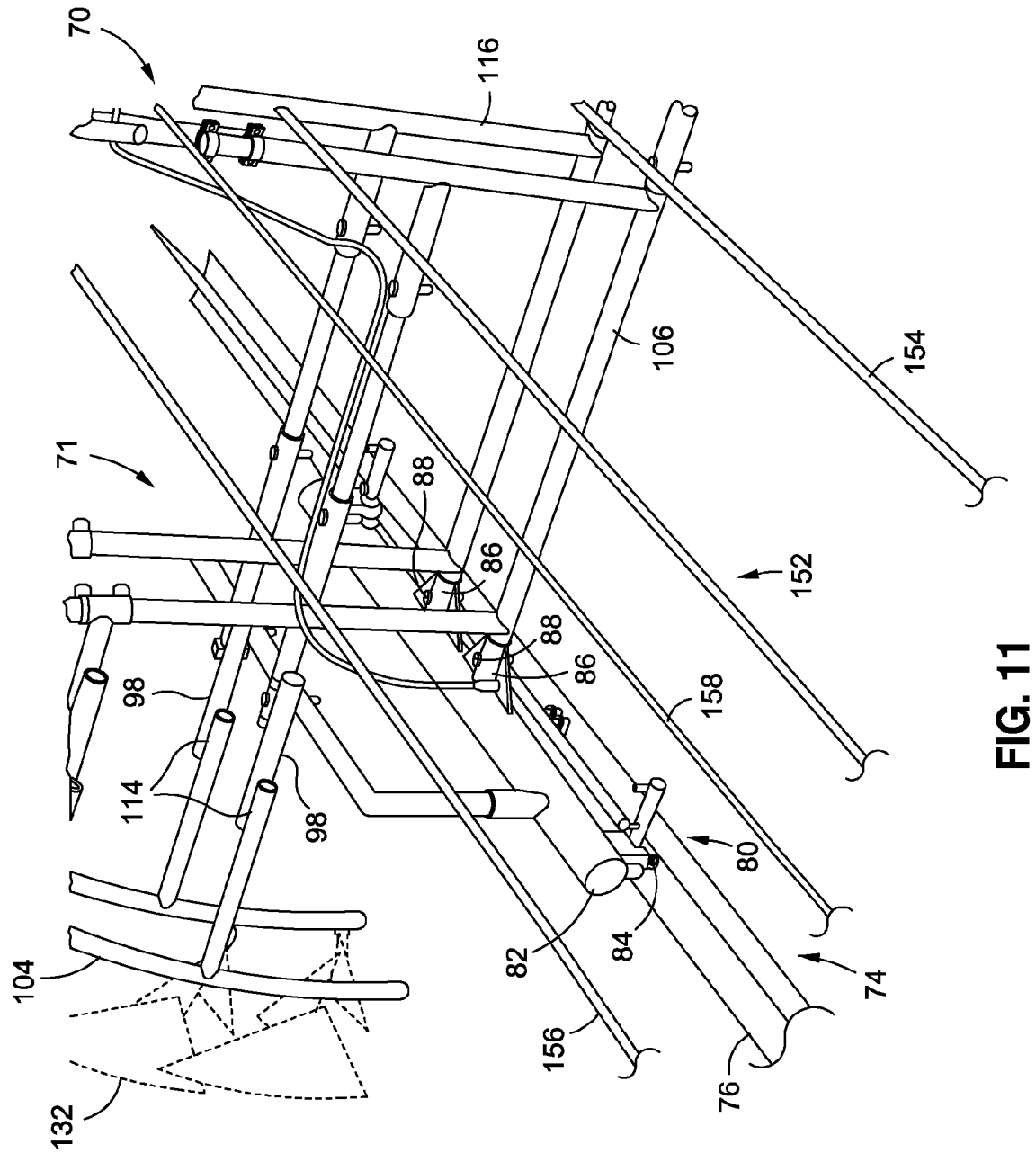
FIG. 11 is an illustration of an enlarged close-up perspective view of the pneumatic linear drive devices of the automated cleaning system of FIG. 10.

As shown in FIGS. 6-8, the movable assembly 72 further comprises a manifold and frame assembly 94 mounted on the automated transport mechanism 80. In one embodiment the manifold and frame assembly 94 comprises a lightweight, snap together manifold and frame assembly 96 (see FIGS. 7 and 10). Preferably, the manifold and frame assembly 94 is made of a lightweight anodized aluminum or other suitable lightweight anodized metals. The snap together manifold and frame assembly 96 preferably comprises one or more pneumatic linear drive devices 98 for adjusting a height (h) 100 or distance of the snap together manifold and frame assembly 96 to adjust to any change of an inner diameter 102 (see FIG. 2) of the aircraft fuselage interior 30 to be cleaned or to adjust to changing contours of the aircraft fuselage interior 30. The pneumatic linear drive device 98 may comprise air driven telescopic tubes that can telescope back and forth to move the snap together manifold and frame assembly 96 up and down or in and out from the sides. The manifold and frame assembly 96 preferably comprises one or more arched manifolds 104 coupled to one or more frame structures 106 via one or more removable attachment elements 108. Preferably, the manifold and frame assembly 96 comprises split frame arched manifolds such as two arched manifolds 104 and two frame structures 106. The attachment elements 108 may comprise détente pins 110, bolts, or other suitable attachment elements. Each arched manifold 104 may comprise one or more modular weldment pieces 112 that can be attached together with attachments or fittings such as snap fittings, spring loaded fittings, screws, pins, bolts or other suitable attachments or fittings. The one or more pneumatic linear drive devices 98 may be coupled between the arched manifold 104 and the frame structure 106 at various connection points 114 (see FIG. 11). The one or more pneumatic linear drive devices 98 may be bolted at the connection points 114. FIG. 11 is an illustration of an enlarged close-up perspective view of the pneumatic linear drive devices 98 of the automated cleaning system 71 of FIG. 10. In particular, the arched manifolds 104 may be adjustable in the z-axis to adjust to any changing contours of the aircraft fuselage interior 30. As shown in FIG. 10, the frame structure 106 may comprise one or more modular weldment pieces 116 that can be attached together with attachments or fittings such as snap fittings, spring loaded fittings, or other suitable attachments or fittings. Each frame structure 106 may further comprise one or more split rail disconnect weldment pieces 118.

In another embodiment the manifold and frame assembly 94 comprises a gantry frame and manifold assembly 120 (see FIGS. 8, 9, and 12) having one or more removable pins 122 (see FIG. 12) used with one or more pneumatic linear drive devices 98 (see FIG. 12) for adjusting a height (h) 124 or distance of the gantry frame and manifold assembly 120 to adjust to any change of an inner diameter 102 (see FIG. 2) of the aircraft fuselage interior 30 to be cleaned or to adjust to changing contours of the aircraft fuselage interior 30. The removable pins 122 may comprise screw, bolts, or other suitable attachment elements. The pneumatic linear drive device 98 may comprise air driven telescopic tubes that can telescope back and forth to move the gantry frame and manifold assembly 120 up and down or in and out from the sides. The gantry frame and manifold assembly 120 preferably comprises one or more arched manifolds 104. Preferably, the gantry frame and manifold assembly 120 comprises two arched manifolds 104. Preferably, each arched manifold 104 is made of a lightweight anodized aluminum or other suitable lightweight anodized metals. The arched manifold 104 may comprise one or more modular weldment pieces 112 that can be attached together with attachments or fittings such as snap fittings, spring loaded fittings, or other suitable attachments or fittings. The gantry frame and manifold assembly 120 preferably comprises a gantry assembly 54 having a gantry frame 58 and a gantry platform 56 (see also FIG. 4), where the gantry frame 58 is coupled to each arched manifold 104 via one or more removable attachment elements 108. The attachment elements 108 may comprise détente pins 110, bolts, or other suitable attachment elements.

Figure 13:
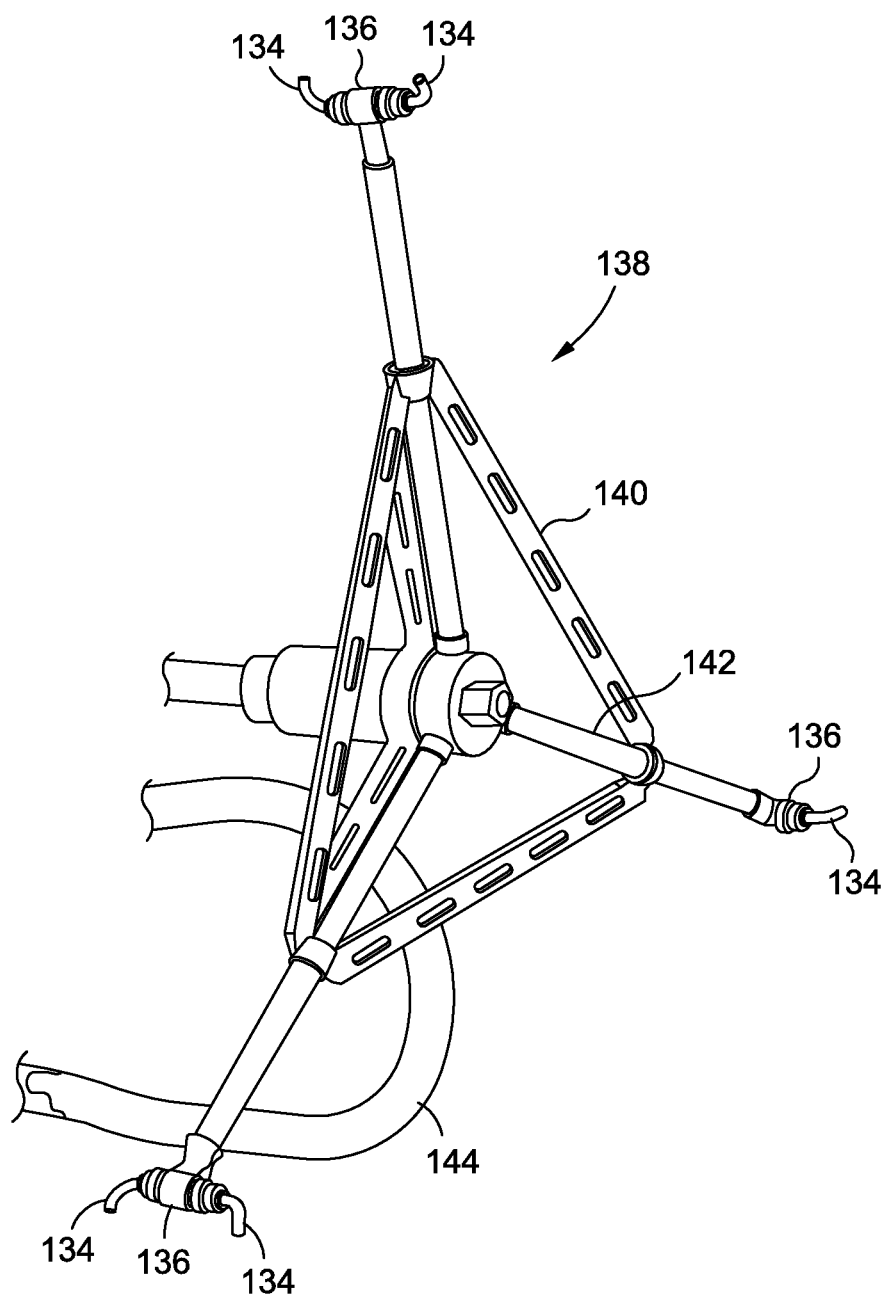
FIG. 13 is an illustration of a front perspective view of an exemplary fluid dispensing assembly used with the automated cleaning system of the disclosure.
Figure 14:
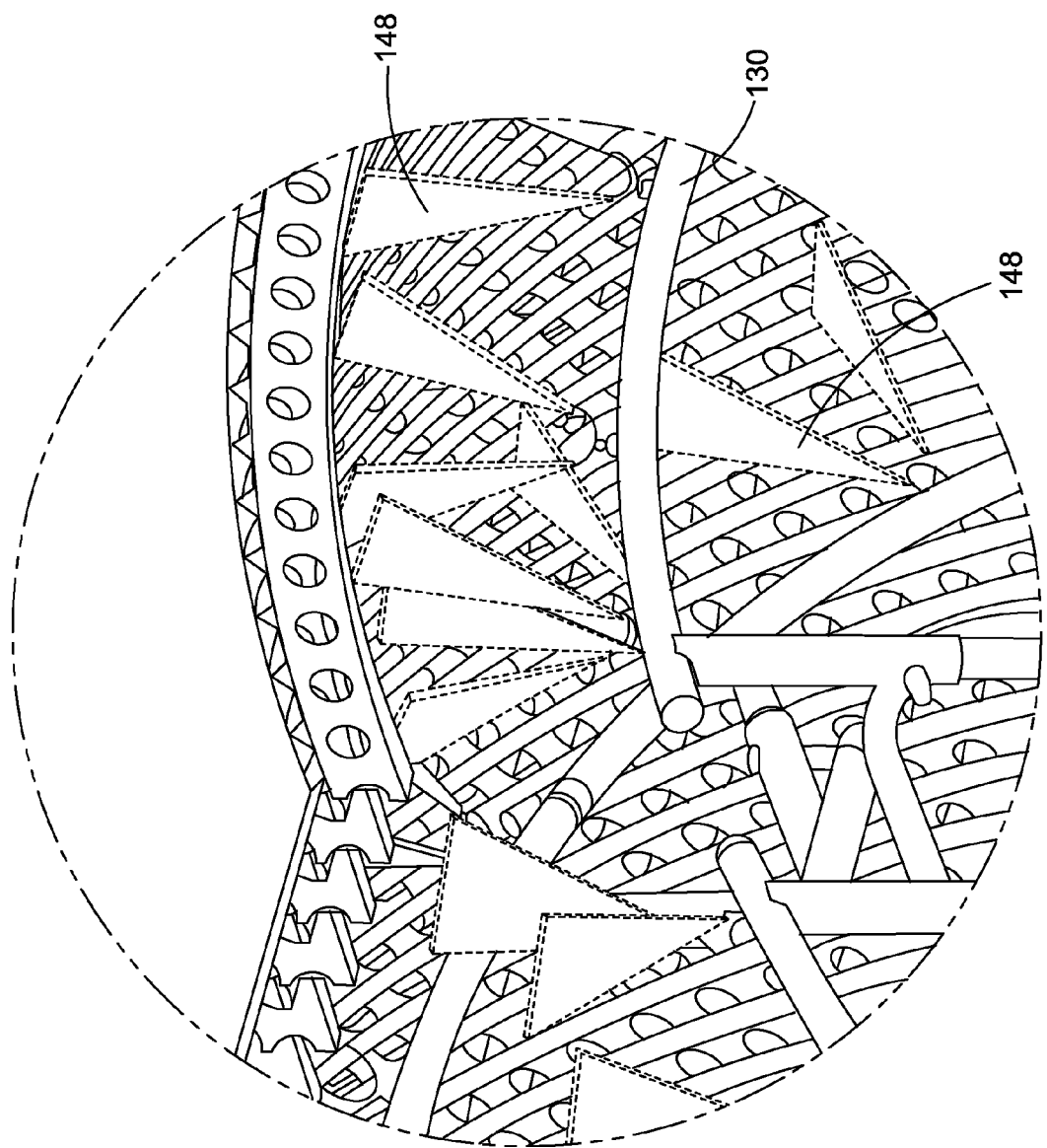
FIG. 14 is an illustration of a close-up view of an exemplary embodiment of spray patterns of an exemplary fluid dispensing assembly used with one of the embodiments of the automated cleaning system of the disclosure.

As shown in FIGS. 6-8, the movable assembly 72 further comprises a fluid dispensing assembly 130 coupled to the manifold and frame assembly 94 for dispensing one or more fluids 132 onto an aircraft fuselage interior surface 38 to be cleaned. The fluid dispensing assembly 130 comprises a plurality of spray nozzles 134 for dispensing the one or more fluids 132. The fluids 130 may comprise water such as clean water or recycled water, cleaning fluids such as detergents, disinfectants, degreasers, multipurpose cleaners, and other suitable cleaning fluids, and compressed air, or another suitable fluid. The plurality of spray nozzles 134 may comprise a plurality of spray heads 136. Preferably, the spray heads 136 are oscillating and preferably, each spray nozzle 134 has six (6) spray heads 136 per spray nozzle 134. The spray nozzles 134 and spray heads 136 are preferably attached to each arched manifold 104. Each arched manifold 104 may preferably have nine (9) oscillating spray heads 136 spaced apart equidistance from each other. FIG. 13 is an illustration of a front perspective view of an exemplary fluid dispensing apparatus 138 used in the fluid dispensing assembly 130 of the automated cleaning systems 70, 71, 73 of the disclosure. The fluid dispensing apparatus 138 preferably comprises a propeller nozzle 140 with a frame 142 having spray nozzles 134 and spray heads 136 and one or more fluid supply connectors 144. The propeller nozzle 140 may be obtained from ENZ USA Inc. of Aurora, Ill. FIG. 14 is an illustration of a close-up view of an exemplary embodiment of spray patterns 150 of an exemplary fluid dispensing assembly 130 used with the automated cleaning systems 70, 71, 73 of the disclosure.

Figure 16:
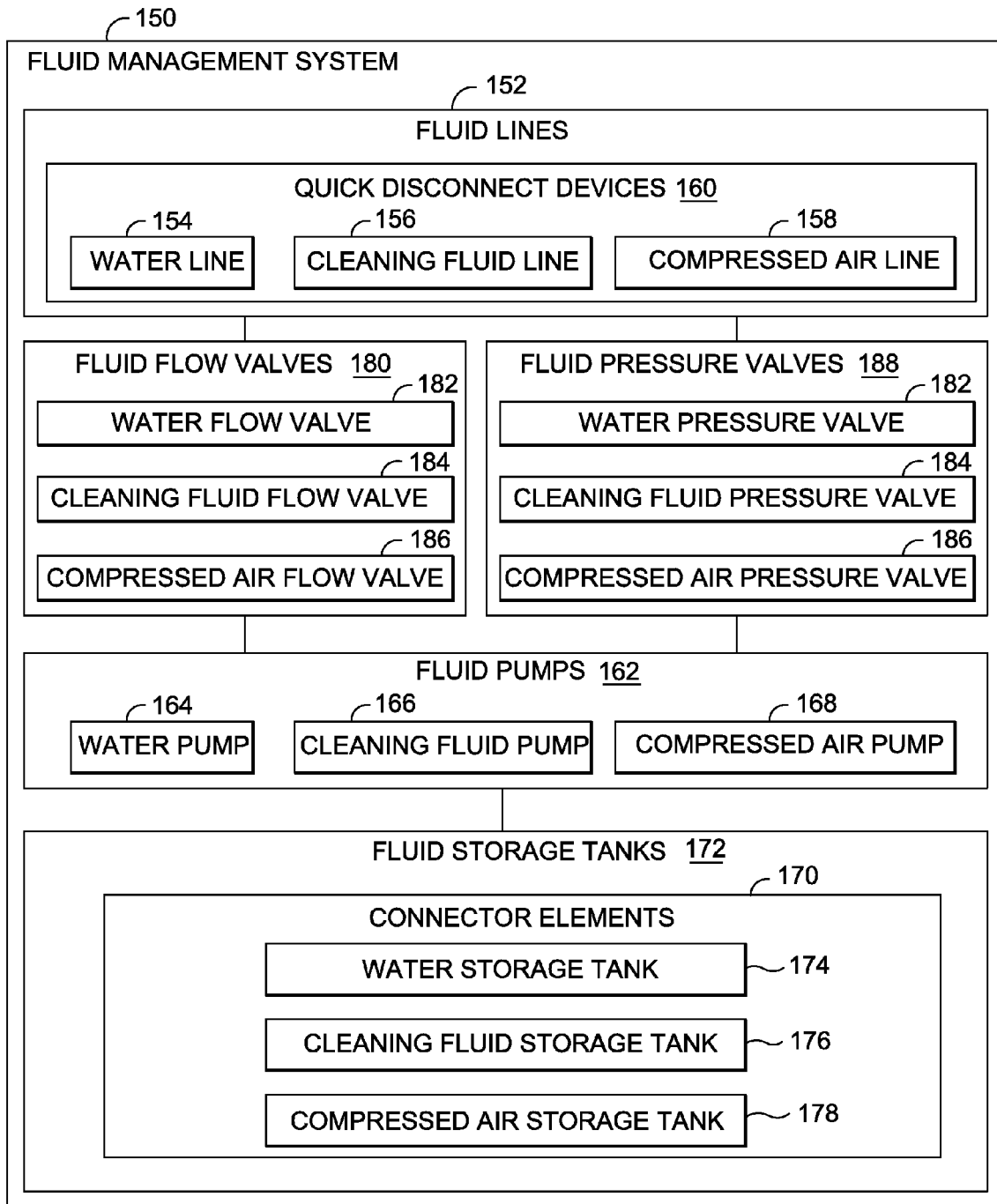
FIG. 16 is an illustration of a block diagram of one of the embodiments of a fluid management system of the automated cleaning system of the disclosure; and, FIG. 17 is an illustration of a flow diagram of an embodiment of an automated cleaning method of the disclosure.

As shown in FIGS. 6-8, the automated cleaning systems 70, 71, 73 further comprise a fluid management system 150 coupled to the movable assembly 72 for supplying the one or more fluids 132 to the fluid dispensing assembly 130. FIG. 16 is an illustration of a block diagram of one of the embodiments of the fluid management system 150 of the automated cleaning systems 70, 71, 73 of the disclosure. As shown in FIGS. 9, 10 and 16, the fluid management system 150 comprises one or more quick disconnect fluid lines 152, such as hoses, for supplying the one or more fluids 132 to the fluid dispensing assembly 130. As shown in FIG. 10, the fluid lines 152 may be connected overhead to a fluid line housing 151. As shown in FIG. 16, the fluid lines 152 may comprise a water line 154, a cleaning fluid line 156, a compressed air line 158, or another suitable fluid line. The fluid lines 152 may be connected to the fluid dispensing assembly 130 with quick disconnect devices 160. The quick disconnect devices 160 may comprise spring loaded fittings, bolts, screws or another suitable quick disconnect device. The fluid lines 152 or hoses can be easily and quickly disconnected from the fluid dispensing assembly 130 and can be stored in an elevated manner above the existing flooring on an elevated mounting fixture or can be stored on a floor mounted fixture. This elevated mounting or floor mounting avoids the creation of any obstacles to the operators during the cleaning process.

As shown in FIGS. 9, 10 and 16, the fluid management system 150 further comprises one or more fluid pumps 162 coupled to the one or more fluid lines 152 for delivering the one or more fluids 132 to the one or more fluid lines 152. As shown in FIG. 16, the fluid pumps 162 may comprise a water pump 164, a cleaning fluid pump 166, a compressed air pump 168, or another suitable fluid pump.

As shown in FIGS. 9, 10 and 16, the fluid management system 150 further comprises one or more fluid storage tanks 172 coupled to the one or more fluid pumps 162 for supplying the one or more fluids 132 to the one or more fluid pumps 162. As shown in FIG. 16, the fluid storage tanks 172 may comprise a water storage tank 174, a cleaning fluid storage tank 176, a compressed air storage tank 178, or another suitable fluid storage tank. The fluid storage tanks 172 may be coupled to the fluid pumps 162 with connector elements 170.

As shown in FIGS. 9, 10 and 16, the fluid management system 150 further comprises one or more fluid flow valves 180 coupled to the one or more fluid pumps 162 for regulating a flow of the one or more fluids 132 from the fluid storage tanks 172 to the fluid lines 152. As shown in FIG. 16, the fluid flow valves 180 may comprise a water flow valve 182, a cleaning fluid flow valve 184, a compressed air flow valve 186, or another suitable fluid flow valve.

As shown in FIGS. 9, 10 and 16, the fluid management system 150 further comprises one or more fluid pressure valves 188 coupled to the one or more fluid pumps 162 for regulating a pressure of the one or more fluids 132 from the fluid storage tanks 172 to the fluid lines 152. As shown in FIG. 16, the fluid pressure valves 188 may comprise a water pressure valve 190, a cleaning fluid pressure valve 192, a compressed air pressure valve 194, or another suitable fluid pressure valve. The fluid pumps 162 may be coupled to the fluid lines 152 via the one or more fluid flow valves 180 and the one or more fluid pressure valves 188.

The automated cleaning system 70 further comprises a control system 200 that communicates with and controls the movable assembly 72 and the fluid management system 150. The control system 200 also communicates with facility personal computers (PCS) 202 located near the control system 200 or in another location and other suitable field devices. The control system 200 comprises a power source 204 for supplying power to the control system 200. The power source 204 is preferably an electrical power source. The control system 200 further comprises a control box 206 that houses a programmable logic controller (PLC) 208. The PLC 208 implements both automatic and remote manual control actions. The PLC 208 monitors the fluid pumps 162 and fluid storage tanks 172 typically located at ground level outside of the aircraft fuselage interior 30. The PLC 208 monitors various water, cleaning fluid, and compressed air parameters, controls selected fluid flow valves 180, fluid pressure valves 188, air motors 86, 92, and limit switch 88 operations and performs specified interlock and alarm functions. The PLC 208 monitors, displays, and controls selected system parameters and processes for wetting, cleaning fluid/soap, rinse and air dry cycles plus system motion controller for fuselage inner diameter adjustment for height adjustment.

The PLC 208 comprises a PLC hardware system 210 and a PLC software system 212. The PLC hardware system 210 comprises a computer processor 214 having at least a built-in first communication port 216 and a built-in second communication port 218. The computer processor 214 may comprise a MODICON® QUANTUM™ PLC computer processor. The first communication port 216 may comprise an Ethernet TCP/IP (Transmission Control Protocol/Internet Protocol) port 220. The second communication port may comprise a Modbus serial communication port 222. The PLC 208 communicates with the facility PCS 202 and the automated transport mechanism 80, such as the guided cart 82, using the Modbus serial communication port 22 and protocol. The PLC hardware system 210 further comprises a remote input/output (I/O) system 224. The I/O system 224 may comprise a plurality of remote input/output (I/O) modules 226 such as MODICON® MOMENTUM™ discrete-in (DI), discrete-out (DO), analog-in (AL) communication adaptors. The PLC hardware system 210 further comprises one or more Ethernet communication adaptors 228. The Ethernet communication adaptor 228 may comprise a MOMENTUM™ Ethernet TCP/IP communication adaptor 230 located in the remote I/O modules 226. The PLC hardware system 210 further comprises a device net communications adaptor 232 which is preferably located in the control box 206 housing the PLC 208. The PLC 208 communicates with air motors 86, 92 and the pneumatic linear drive devices 98 using the device net communications adaptor 232 and protocol. The PLC software system 212 may comprise a software for programming the PLC 208, such as an off-the-shelf Concept version 2.6 software, obtained from Telemecanique/Schneider Electric Industries SAS of Palatine, Ill.

The control system 200 may further comprise a human machine interface (HMI) system 234 comprising a plurality of HMI controls 236. The HMI controls 236 may be activated by an operator by selection of an HMI control or button that sends a message to the PLC 208 to initiate a next automated sequence. This allows manual hold points to separate the automated sequences. Sequence details may include timers, timed delays, and set points. The HMI system 234 further comprises an HMI software 238. The HMI software 238 is used to program an HMI touch screen panel (not shown). The HMI software 238 may comprise an off-the-shelf software such as VIJEO DESIGNER™ software, obtained from Schneider Electric Industries SAS of Palatine, Ill. for programming the HMI touch screen panel. The touch screens may comprise an overview process screen, an alarm summary screen, process sequence screens, or other suitable touch screens. The air motor 86 and the limit switch 88 moves the guided cart 82 back and fourth on the removable track assembly 74 using the PLC 208 and the touch screen panel which are interconnected by connection components (not shown) such as switches, hubs and cabling to the remote I/O modules 226, the air motor 86 and the pneumatic linear drive devices 98.

Hardwired interlocks such as the interlock motion sensor devices 242 and the limit switches 88 or electric stops (E-stop) and the presence detection device 250, such as the light curtain 252, may be controlled by the PLC 208 or may be stand alone devices not controlled by the PLC 208. Additional sets of relay contacts 244 or sensors may be used to transmit the hardwired interlock, such as the interlock motion sensor devices 242, for the purpose of setting any safety alarms or other motion or sensor devices.

As shown in FIGS. 7, 8, 10 and 12, the automated cleaning systems 71, 73 may further comprise a motion controller system 240 that can be controlled by the control system 200. The motion controller system 240 may comprise one or more interlock motion sensor devices 242 attached to a portion of the aircraft fuselage interior 30 and one or more relay contacts or sensors 244 attached to the movable assembly 72, and preferably attached to a portion of the arched manifold 104. As the movable assembly 72 approaches the interlock motion sensor devices 242, the interlock motion sensor device 242 senses the relay contacts or sensors 244 on the movable assembly 72, preferably on the arched manifold 104, and adjusts a height or distance of the manifold and frame assembly 94 to adjust to any change of an inner diameter of the aircraft fuselage interior 30 to be cleaned or to adjust to changing contours of the aircraft fuselage interior 30 to be cleaned.

As shown in FIGS. 7, 8, 10 and 12, the automated cleaning systems 71, 73 may further comprise a presence detection device 250 attached to opposite sides of the upper half or upper portion 31 of the aircraft fuselage interior 30 for safety shut off of the movable assembly 72. Preferably, the presence detection device 250 comprises a light curtain 252 that shuts the movable assembly 72 off or stops the movable assembly 72 as the movable assembly 72 approaches the light curtain 252. The light curtain 252 may comprise a beam (not shown) that spans the distance from one presence detection device 250 on one side of the upper half or upper portion 31 of the aircraft fuselage interior 30 to another presence detection device 240 on the opposite side of the upper half or upper portion 31 of the aircraft fuselage interior 30.

Preferably, the automated cleaning systems 70, 71, 73 can be managed and operated by a single operator who operates the control system and other controls. Preferably, the automated cleaning systems 70, 71, 73 reduce a total process cleaning time for a single cleaning operation to three passes (wetting/rinsing with water, cleaning fluid wash/water rinse, and drying) of the movable assembly 72 along a length of the aircraft fuselage interior 30, as compared to a total process cleaning time for manual cleaning of twenty-four (24) hours for a single cleaning operation. Alternatively, the automated cleaning systems 70, 71, 73 can reduce a total process cleaning time for a single cleaning operation to four passes (wetting/rinsing with water, cleaning fluid wash, water rinse, and drying) of the movable assembly 72 along a length of the aircraft fuselage interior 30. Preferably, the automated cleaning systems 70, 71, 73 provide an improved overall quality of cleaning of the aircraft fuselage interior 30 by providing a greater area of cleaning coverage of the aircraft fuselage interior 30, as compared to manual cleaning.

In another embodiment of the disclosure as shown in FIGS. 7, 10 and 11, there is provided an automated cleaning system 71 for cleaning an aircraft fuselage interior 30 that can be managed and operated by a single operator. The automated cleaning system 71 comprises a movable assembly 72 designed to fit within the aircraft fuselage interior 30 to be cleaned. The movable assembly 72 comprises a removable track assembly 74 that can be connected to and disconnected from a floor 34 of the aircraft fuselage interior 30 to be cleaned. The movable assembly 72 further comprises an automated transport mechanism 80 comprising an air motor driven automated guided cart 82 mounted on the removable track assembly 74 for traveling along a length of the aircraft fuselage interior 30 to be cleaned. The movable assembly 74 further comprises a manifold and frame assembly 94 comprising a snap together manifold and frame assembly 96 mounted on the automated transport mechanism 80 comprising the automated guided cart 82 and having one or more pneumatic linear drive devices 98 for adjusting a height 100 or distance of the snap together manifold and frame assembly 96 to adjust to any change of an inner diameter 102 (see FIG. 2) of the aircraft fuselage interior 30 to be cleaned. The movable assembly 72 further comprises a fluid dispensing assembly 130 coupled to the manifold and frame assembly 94 comprising the snap together manifold and frame assembly 96 for dispensing one or more fluids 132 onto an upper half or upper portion 31 of an aircraft fuselage interior surface 38 to be cleaned. The automated cleaning system 71 further comprises a fluid management system 150 coupled to the movable assembly 72 for supplying the one or more fluids 132 to the fluid dispensing assembly 130. The automated cleaning system 71 further comprises a motion controller system 240 for adjusting a height 100 or distance of the manifold and frame assembly 94 comprising the snap together manifold and frame assembly 96 to adjust to any change of an inner diameter 102 of the aircraft fuselage interior 30 to be cleaned. The automated cleaning system 71 further comprises a control system 200 that communicates with and controls the movable assembly 72, the fluid management system 150, and the motion controller system 240. The automated cleaning system 71 further comprises a presence detection device 250 preferably in the form of a light curtain 252 for safety shut off of the movable assembly 72.

Figure 15:
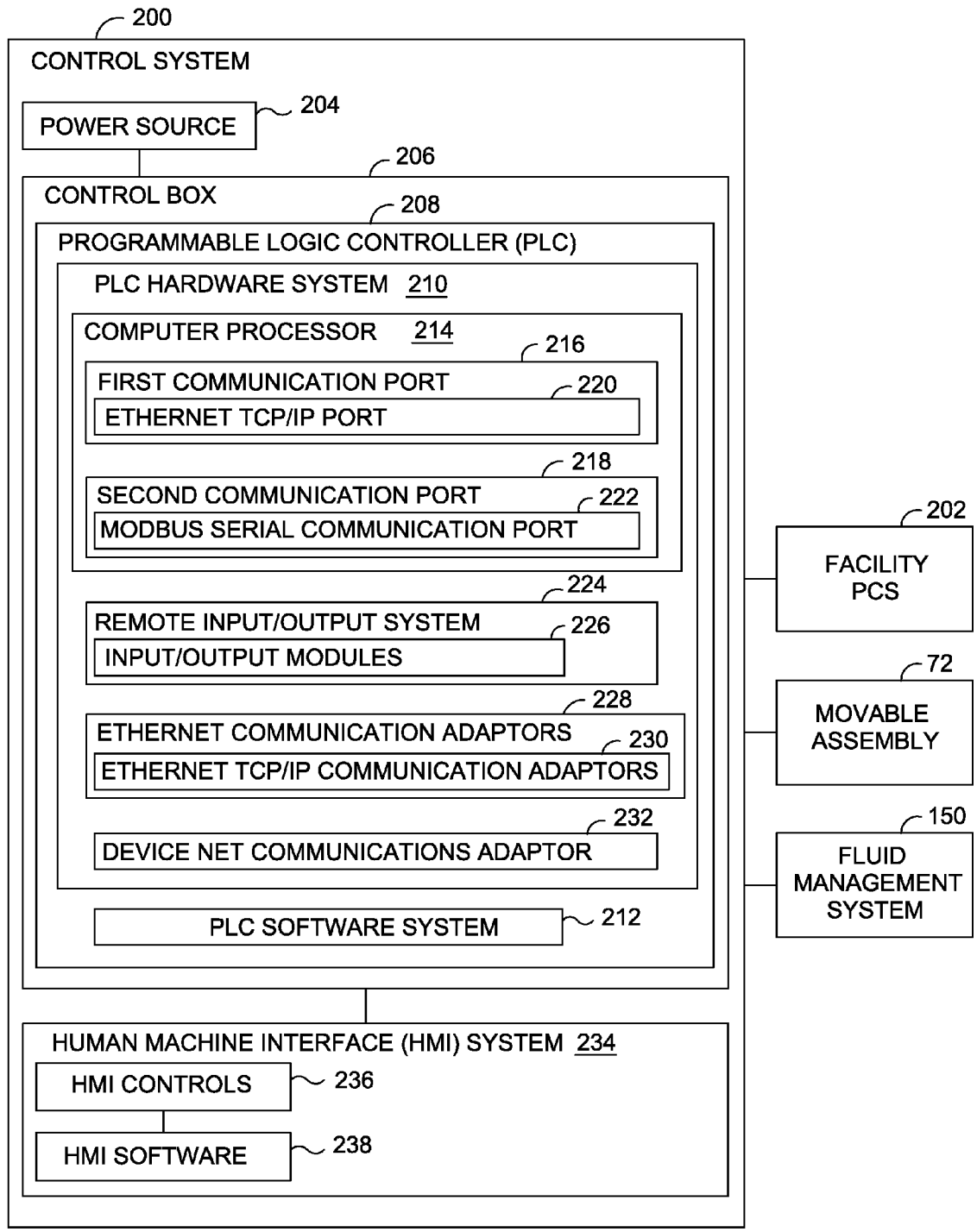
FIG. 15 is an illustration of a block diagram of one of the embodiments of a control system of the automated cleaning system of the disclosure.
Figure 17:
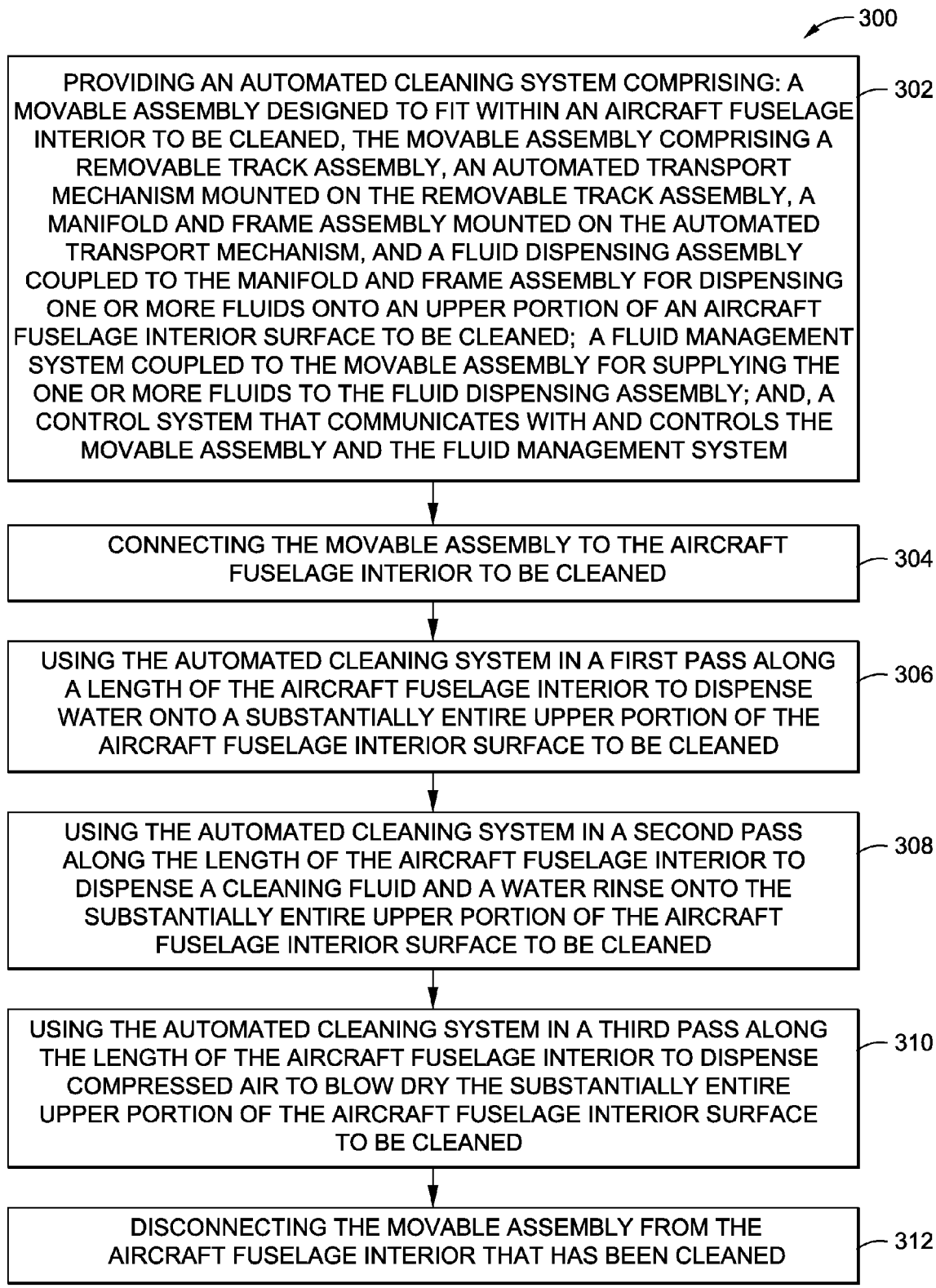

In another embodiment of the disclosure, there is provided a method 300 for cleaning an aircraft fuselage interior. FIG. 17 is an illustration of a flow diagram of an embodiment of the automated cleaning method 300 of the disclosure. The method 300 comprises step 302 of providing an automated cleaning system 70, 71 or 73 (see FIGS. 6-8), as discussed above. The automated cleaning systems 70, 71, 73 comprise a movable assembly 72 designed to fit within an aircraft fuselage interior 30 to be cleaned. The movable assembly 72 further comprises a removable track assembly 74, as discussed above. The movable assembly 72 further comprises an automated transport mechanism 80, as discussed above, mounted on the removable track assembly 74. The movable assembly 72 further comprises a manifold and frame assembly 94, as discussed above, mounted on the automated transport mechanism 80. The movable assembly 72 further comprises a fluid dispensing assembly 130, as discussed above, coupled to the manifold and frame assembly 94 for dispensing one or more fluids 132 onto an upper half or upper portion 31 of an aircraft fuselage interior surface 38 to be cleaned. The automated cleaning systems 70, 71, 73 further comprise a fluid management system 150 (see FIG. 16), as discussed above, coupled to the movable assembly 72 for supplying the one or more fluids 132 to the fluid dispensing assembly 130. The automated cleaning systems 70, 71, 73 further comprise a control system 200 (see FIG. 15), as discussed above, that communicates with and controls the movable assembly 72 and the fluid management system 150.

The method 300 further comprises step 304 of connecting the movable assembly 72 to the aircraft fuselage interior 30 to be cleaned. The first rail 76 and the second rail 78 of the removable track assembly 74 of the movable assembly 72 may be attached or mounted into the openings 46 (see FIG. 3) in the lateral or horizontal beams 46 of the floor 34 of the aircraft fuselage interior 30. The removable track assembly 74 is preferably modular, and each of the first rail 76 and the second rail 78 may comprise one or more pieces attached together lengthwise along a length of the aircraft fuselage interior 30.

The method 300 further comprises step 306 of using the automated cleaning system 70, 71, or 73 in a first pass along a length of the aircraft fuselage interior 30 to dispense water onto a substantially entire upper half or upper portion 31 of an aircraft fuselage interior surface 38. The method 300 further comprises step 308 of using the automated cleaning system 70, 71, or 73 in a second pass along the length of the aircraft fuselage interior 30 to dispense a cleaning fluid and a water rinse either simultaneously or in succession in the same pass onto the substantially entire upper half or upper portion 31 of the aircraft fuselage interior surface 38. The method 300 further comprises step 310 of using the automated cleaning system 70, 71, or 73 in a third pass along the length of the aircraft fuselage interior 30 to dispense compressed air to blow dry the substantially entire upper half or upper portion 31 of the aircraft fuselage interior surface 38. The method 300 further comprises step 312 of disconnecting the movable assembly 72 from the aircraft fuselage interior 30 that has been cleaned. The automated cleaning system 70, 71, or 73 provides an improved overall quality of cleaning of the upper half or upper portion 31 of the aircraft fuselage interior 30 by providing a greater area of cleaning coverage of the upper half or upper portion 31 of the aircraft fuselage interior 30, as compared to manual cleaning. The automated cleaning method 300 preferably reduces a total process cleaning time for a single cleaning operation to three passes of the movable assembly 72 along a length of the aircraft fuselage interior 30, as compared to a total process cleaning time for manual cleaning of twenty-four hours for a single cleaning operation. Alternatively, the automated cleaning method 300 reduces a total process cleaning time for a single cleaning operation to four passes of the movable assembly 72 along a length of the aircraft fuselage interior 30. The four pass method may comprise a first pass along a length of the aircraft fuselage interior 30 to dispense water onto a substantially entire upper half or upper portion 31 of an aircraft fuselage interior surface 38, a second along the length of the aircraft fuselage interior 30 to dispense a cleaning fluid onto the substantially entire upper half or upper portion 31 of the aircraft fuselage interior surface 38, a third pass along the length of the aircraft fuselage interior 30 to dispense a water rinse onto the substantially entire upper half or upper portion 31 of the aircraft fuselage interior surface 38, and a fourth pass along the length of the aircraft fuselage interior 30 to dispense compressed air to blow dry the substantially entire upper half or upper portion 31 of the aircraft fuselage interior surface 38. The automated cleaning method 300 preferably provides an improved overall quality of cleaning of the upper half or upper portion 31 of the aircraft fuselage interior 30 by providing a greater area of cleaning coverage of the upper half or upper portion 31 of the aircraft fuselage interior 30, as compared to manual cleaning.

Embodiments of the automated cleaning systems 70, 71, 73 and automated cleaning method 300 provide an automated cleaning system for cleaning inside the fuselage interiors of commercial aircraft and other types of aircraft, such as prior to applying primer to the aircraft fuselage interior surface in order to eliminate or minimize the presence of contaminants or other unwanted materials on the aircraft fuselage interior surface, or in order to activate the primer. The automated cleaning systems 70, 71, 73 and automated cleaning method 300 can be adapted to work with existing gantry assemblies 54 or can work as a stand alone and separate system. The automated cleaning systems 70, 71, 73 and automated cleaning method 300 can use lightweight, removable arch manifolds 104, and in some embodiments, lightweight frame structures 106, that can be easily taken apart for removal from a work area.

The embodiment of the automated cleaning system 71 that can be separately used as a stand alone structure may provide for easy set-up and complete removal from the aircraft fuselage interior 30, may provide full spray coverage capability, may be lightweight with a welded aluminum manifold and frame assembly 94, may be air driven, may have adjustable arched manifolds 104 attached to pneumatic linear drive devices 98 where the arched manifolds 104 may be adjustable in the z-axis to adjust to changing contours in the aircraft fuselage interior 30, may provide for a light curtain 252 for safety shut-off, may provide for elevated or floor mounted fluid lines such as air and water hoses, may be managed by one person, may have nine (9) oscillating spray heads 136 per arched manifold 104 and six (6) spray heads 136 per spray nozzle 134, may have fluid flow rates and fluid pressure settings at the fluid pumps 162, may have spray nozzles 134 that can also be used as a blow dry function with compressed air, and may provide containment for water control or recycled water options.

This embodiment of the automated cleaning system 73 that can be adapted to an existing gantry assembly 54 may be height adjusted with removable pins 122 and pneumatic linear drive devices 98, may be air motor driven, may be lightweight with the one or more removable arched manifolds 104, may be managed by one person, may have nine (9) oscillating spray heads 136 per arched manifold 104 and six (6) spray heads 136 per spray nozzle 134, may have fluid flow rates and fluid pressure settings at the fluid pumps 162, may have spray nozzles 134 that can also be used as a blow dry function with compressed air, and may provide containment for water control or recycled water options.

In addition, the automated cleaning systems 70, 71, 73 and automated cleaning method 300 can reduce process flow time and can be capable of cleaning the entire or substantially the entire upper half or upper portion 31 of an aircraft fuselage interior surface 38 of an aircraft in three (3) passes or four (4) passes instead of twenty-four (24) hours total time spent using a known manual labor method. Thus, time can be saved and production costs can be decreased. The automated cleaning systems 70, 71, 73 and automated cleaning method 300 automate the cleaning process and eliminate manual cleaning methods which can require four (4) or more human operators to complete. The automated cleaning systems 70, 71, 73 and automated cleaning method 300 disclosed herein can be managed by one human operator. Thus, labor and production costs can be reduced.

Moreover, the automated cleaning systems 70, 71, 73 and automated cleaning method 300 can provide full coverage cleaning of all or substantially all of the upper half or upper portion 31 of the aircraft fuselage interior surface 38. Thus, improvement in the quality of the cleaning process is increased. The automated cleaning systems 70, 71, 73 and automated cleaning method 300 preferably use oscillating spray heads 136 which are preferably mounted to the arched manifolds 104 and that spray upward as the automated transport mechanism 80, such as the guided cart 82, travels the length of the aircraft fuselage interior 30. The wetting of the aircraft fuselage interior surface 38 is preferably followed by a cleaning fluid and water rinse and then followed by a drying cycle, all through water and air arched manifolds 104 having attached spray nozzles 134. The same spray nozzles 134 may be used for water, cleaning fluid and/or compressed air. Thus, the spray nozzles 134 may also be used as a blow dry function with the use of compressed air.

In addition, the automated cleaning systems 70, 71, 73 and automated cleaning method 300 can eliminate operators having to walk on wet surfaces or flooring 34 of the aircraft fuselage interior 30 during the cleaning process, and can eliminate any ergonomic issues for operators as operators no longer need to manually clean with a hose, and thus repetitive arm movements used during application and spraying of the water, cleaning solution, and/or air are eliminated. Finally, the automated cleaning systems 70, 71, 73 and automated cleaning method 300 provide for elevated storage mounting or floor mounting of the fluid lines 152 used for dispensing the water, the cleaning solution, and the air, when not in use, and this can eliminate or minimize any creation of obstacles during the cleaning process.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method for cleaning an aircraft fuselage interior, the method comprising:
　　connecting a movable assembly of an automated cleaning system to an aircraft fuselage interior to be cleaned, the automated cleaning system comprising:
　　　a movable assembly designed to fit within the aircraft fuselage interior to be cleaned, the movable assembly comprising:
　　　　a removable track assembly;
　　　　an automated transport mechanism mounted on the removable track assembly, the automated transport mechanism comprising a guided cart that travels on the removable track assembly along a length of the aircraft fuselage interior;

a manifold and frame assembly mounted on the automated transport mechanism, the manifold and frame assembly comprising one or more adjustable arched manifolds; and, a fluid dispensing assembly coupled to the manifold and frame assembly, the fluid dispensing assembly comprising a plurality of spray nozzles and spray heads attached to each of the one or more adjustable arched manifolds, for dispensing one or more fluids onto the upper portion of the aircraft fuselage interior surface to be cleaned;

a fluid management system coupled to the movable assembly for supplying the one or more fluids to the fluid dispensing assembly; and, a control system that communicates with and controls the movable assembly and the fluid management system;

using the automated cleaning system in a first pass along the length of the aircraft fuselage interior to dispense water onto an upper portion of the aircraft fuselage interior surface to be cleaned;

using the automated cleaning system in a second pass along the length of the aircraft fuselage interior to dispense a cleaning fluid and a water rinse onto the upper portion of the aircraft fuselage interior surface to be cleaned;

using the automated cleaning system in a third pass along the length of the aircraft fuselage interior to dispense compressed air to blow dry the upper portion of the aircraft fuselage interior surface to be cleaned; and, disconnecting the movable assembly from the aircraft fuselage interior that has been cleaned.

2. The method of claim 1 further comprising attaching a device for presence detection comprising a light curtain to the upper portion of the aircraft fuselage interior for safety shut off of the movable assembly.

3. The method of claim 1 wherein the method can be performed by a single operator.

4. The method of claim 1 further comprising adjusting with a motion controller system controlled by the control system a height of the manifold and frame assembly to adjust to any change of an inner diameter of the aircraft fuselage interior while the method is being performed.

5. The method of claim 1 wherein connecting the movable assembly comprises connecting the movable assembly having a snap together manifold and frame assembly mounted on the automated transport mechanism, the snap together manifold and frame assembly having one or more pneumatic linear drive devices for adjusting a height of the snap together manifold and frame assembly to adjust to any change of an inner diameter of the aircraft fuselage interior to be cleaned.

6. The method of claim 1 wherein connecting the movable assembly of the automated cleaning system to the aircraft fuselage interior to be cleaned comprises installing a removable track assembly having a first rail and a second rail that are spaced apart and removably attached in parallel to a floor of the aircraft fuselage interior.

7. The method of claim 6 wherein connecting the movable assembly of the automated cleaning system to the aircraft fuselage interior to be cleaned comprises mounting on the removable track assembly a guided cart having one or more wheels on each side designed to fit within the first rail and the second rail, respectively, of the removable track assembly.

8. The method of claim 1 wherein connecting the movable assembly of the automated cleaning system to the aircraft fuselage interior to be cleaned comprises mounting on the removable track assembly a guided cart that is air motor driven with an air motor and a limit switch.

9. The method of claim 1 wherein connecting the movable assembly of the automated cleaning system to the aircraft fuselage interior to be cleaned comprises coupling the one or more adjustable arched manifolds to one or more frame structures via one or more removable attachment elements, the one or more frame structures comprising one or more modular weldment pieces attached together with snap fittings or spring loaded fittings.

10. The method of claim 1 wherein connecting the movable assembly of the automated cleaning system to the aircraft fuselage interior to be cleaned comprises coupling the fluid management system to the movable assembly and supplying the one or more fluids to the fluid dispensing assembly having a plurality of spray nozzles for dispensing the one or more fluids selected from the group comprising water, cleaning fluid, and compressed air.

11. The method of claim 1 wherein connecting the movable assembly of the automated cleaning system to the aircraft fuselage interior to be cleaned comprises coupling the fluid management system to the movable assembly with the steps comprising:

installing one or more quick disconnect fluid lines and supplying the one or more fluids to the fluid dispensing assembly, the one or more quick disconnect fluid lines selected from the group comprising a water line, a cleaning fluid line, and a compressed air line;

coupling one or more fluid pumps to the one or more quick disconnect fluid lines and delivering the one or more fluids to the one or more quick disconnect fluid lines, the one or more fluid pumps selected from the group comprising a water pump, a cleaning fluid pump, and a compressed air pump;

coupling one or more fluid storage tanks to the one or more fluid pumps and supplying the one or more fluids to the one or more fluid pumps, the one or more fluid storage tanks selected from the group comprising a water storage tank, a cleaning fluid storage tank, and a compressed air storage tank;

coupling one or more fluid flow valves to the one or more fluid pumps and regulating a flow of the one or more fluids from the one or more fluid storage tanks to the one or more quick disconnect fluid lines, the one or more fluid flow valves selected from the group comprising a water flow valve, a cleaning fluid flow valve, and a compressed air flow valve; and, coupling one or more fluid pressure valves to the one or more fluid pumps and regulating a pressure of the one or more fluids from the one or more fluid storage tanks to the one or more quick disconnect fluid lines, the one or more fluid pressure valves selected from the group comprising a water pressure valve, a cleaning fluid pressure valve, and a compressed air pressure valve.

12. The method of claim 1 wherein connecting the movable assembly of the automated cleaning system to the aircraft fuselage interior to be cleaned comprises communicating with and controlling the movable assembly with the control system comprising a programmable logic controller having a hardware system and a software system, and implementing both automatic and remote manual control actions with the programmable logic controller.

13. The method of claim 1 further comprising managing and operating the automated cleaning system by a single operator.

* * * * *